(12) United States Patent
Kemkemian et al.

(10) Patent No.: US 8,299,958 B2
(45) Date of Patent: Oct. 30, 2012

(54) AIRBORNE RADAR HAVING A WIDE ANGULAR COVERAGE, NOTABLY FOR THE SENSE-AND-AVOID FUNCTION

(75) Inventors: Stépahne Kemkemian, Paris (FR); Pascal Cornic, Guilers (FR); Patrick Le Bihan, Lannilis (FR); Myriam Nouvel-Fiani, Elancourt (FR)

(73) Assignee: Thales, Neuilly sur Seine (FR)

( * ) Notice: Subject to any disclaimer, the term of this patent is extended or adjusted under 35 U.S.C. 154(b) by 153 days.

(21) Appl. No.: 12/881,230

(22) Filed: Sep. 14, 2010

(65) Prior Publication Data

US 2011/0140952 A1 Jun. 16, 2011

(30) Foreign Application Priority Data

Sep. 15, 2009 (FR) ...................................... 09 04394

(51) Int. Cl.
*G01S 13/42* (2006.01)
(52) U.S. Cl. ........ 342/107; 342/113; 342/140; 342/147; 342/157; 342/158
(58) Field of Classification Search .................. 342/107, 342/113, 123, 133, 139–142, 146–147, 157–158
See application file for complete search history.

(56) References Cited

U.S. PATENT DOCUMENTS

| 6,363,033 | B1* | 3/2002 | Cole et al. ..................... 367/138 |
| 7,205,928 | B1* | 4/2007 | Sweet .......................... 342/26 B |
| 2006/0197699 | A1 | 9/2006 | Cornic |
| 2011/0160941 | A1* | 6/2011 | Garrec et al. .................. 701/17 |
| 2011/0187586 | A1* | 8/2011 | Cornic et al. ................. 342/196 |
| 2011/0221625 | A1* | 9/2011 | Cornic et al. .................. 342/29 |
| 2011/0248881 | A1* | 10/2011 | Kemkemian et al. ......... 342/156 |

OTHER PUBLICATIONS

Malmqvist, et al., "On the Use of MEMS Phase Shifters in a Low-Cost Ka-Band Multifunctional ESA on a Small UAV," Microwave Conf 2007, APMC 2007, pp. 1-4, XP031279994 (Dec. 11, 2007).

* cited by examiner

*Primary Examiner* — John B Sotomayor
(74) *Attorney, Agent, or Firm* — Baker & Hostetler LLP

(57) ABSTRACT

An airborne radar device having a given angular coverage in elevation and in azimuth includes a transmit system, a receive system and processing means for carrying out target detection and location measurements. The transmit system includes: a transmit antenna made up of at least a first linear array of radiating elements focusing a transmit beam, said arrays being approximately parallel to one another; at least one waveform generator; means for amplifying the transmit signals produced by the waveform generator or generators; and means for controlling the transmit signals produced by the waveform generator or generators, said control means feeding each radiating element with a transmit signal. The radiating elements being controlled for simultaneously carrying out electronic scanning of the transmit beam in elevation and for colored transmission in elevation.

29 Claims, 7 Drawing Sheets

AIRBORNE RADAR HAVING A WIDE ANGULAR COVERAGE, NOTABLY FOR THE SENSE-AND-AVOID FUNCTION

CROSS-REFERENCE TO RELATED APPLICATION

This application claims priority to foreign French patent application No. FR 09 04394, filed on Sep. 15, 2009, the disclosure of which is incorporated by reference in its entirety.

FIELD OF THE INVENTION

The present invention relates to an airborne radar having a wide angular coverage, notably for the sense-and-avoid function with which for example drones are equipped.

BACKGROUND OF THE INVENTION

The technical problem relates to providing aircraft, particularly drones, with a radar function for the non-cooperative detection of aerial obstacles. This function is essential for allowing autopiloted aircraft to fly in a non-segregated aerial region. It forms part of what is called the "sense-and-avoid" function.

Such a radar must have a very wide field of observation (typically ±110° in azimuth and ±15° in elevation) and must be capable of scanning space in a very short time, of the order of magnitude of one second, owing to the time needed to undertake an avoidance manoeuvre if there is a risk of collision. These characteristics correspond approximately to the capability of a human pilot to observe the environment, as required for a "see-and-avoid" function.

For such an application, it is advantageous to use a transmit antenna or several transmit antennas with a wide field and a plurality of receive antennas with a wide field and to form, on receive, many beams simultaneously in the reconnoitred region: this is a technique known as DBF (digital beam forming).

This solution is conventionally implemented using antenna arrays, the radiation patterns of which must have sufficient directivity to locate targets with high precision.

In the case of a sense-and-avoid application, the main problems that the antenna system, and more generally the radar system, has to solve are notably, in the case of the radar system:

a minimum pre-collision warning time of around 20 seconds for targets having a relative radial velocity RRV of between about 0 and 400 m/s, the RRV being positive for a closing target;

a long range in the case of a fast-moving target, that is to say the Doppler frequency of which is located outside that of the ground clutter; and a shorter range in the case of a slow-moving target, but with good visibility capability with ground clutter present.

Hereafter, by definition, the relative radial velocity or RRV is positive when it corresponds to the target coming closer.

For the antenna system, the main problems are notably:

the T/R (Transmit/Receive) directivity must be better than 10° in the two planes for location precision;

the antenna radiation patterns must have side lobes that are as small as possible so as to reject ground clutter, in particular during low-altitude flight phases and when the target has a low velocity;

moreover, the area of the antenna must be large enough to ensure range efficiency with a reasonable transmit power, typically 20 watts RMS;

in addition to these technical constraints, the radar must be able to be fitted onto various types of aircraft, and the constraints in terms of electronics volume and surface available for the antenna are extremely tight; and finally, the overall cost of the antenna electronics must be minimized.

No radar device meeting all these requirements exists since the current systems:

either do not meet the requirement in terms of measurement replenishment rate and angular extent. In general, radars are provided for other applications, notably for missile homing heads or small navigation radars, it being attempted to adapt these to the sense-and-avoid function problem;

or meet the requirement in terms of angular coverage using electronic scanning; it should be noted that such a system is expensive and, if narrow beams are used, needed for the measurement precision, it must have only a very brief target observation time to meet the constraint relating to measurement replenishment rate. Under these conditions, Doppler processing is not really conceivable, since the Doppler resolution is too coarse, or is even impossible;

or meet the requirement in terms of angular coverage and precision, using conventional DBF techniques with a two-dimensional receive antenna fully equipped with receive modules; it should be noted that such a system is expensive due to the number of modules necessary to achieve the required precision.

Systems operating on the MIMO (multiple inputs-multiple outputs) principle use a multiple-access antenna array as inputs and outputs. An overall antenna system in the form of a cross has notably been described in the article presented at the RADAR 2008 conference in Adelaide (Australia) by Professor John Roulston in September 2008: "The Post-War Development of Fighter Radar in Europe—A British Perspective". As such, this system uses a plurality of codes and their implementation can prove to be very expensive without the particular features of the invention. Another system intended to address the S&A problem, using the MIMO principle, has also been described, during the $5^{th}$ EMRS DTC Technical Conference in Edinburgh, July 2008: "Design Studies for an Airborne Collision Avoidance Radar" by Dennis Longstaff, Mostafa Abu Shaaban and Stefan Lehmann, Filtronic Pty Ltd, Brisbane, Australia. However, such a system has the following drawbacks:

its range is too short with respect to the pre-warning time needed to perform an avoidance manoeuvre; and it specifically deals with avoiding targets in a collision path, but does not solve the problem of horizontal and vertical traffic separation.

SUMMARY OF THE INVENTION

One object of the invention produces a radar device meeting all the abovementioned requirements. For this purpose, the subject of the invention is an airborne radar device having a given angular coverage in elevation and in azimuth, comprising a transmit system, a receive system and processing means carrying out target detection and location measurements, the transmit system comprising:

a transmit antenna made up of at least a first linear array of radiating elements focusing a transmit beam, said arrays being approximately parallel to one another;

at least one waveform generator;

means for amplifying the transmit signals produced by the waveform generator or generators; and means for controlling the transmit signals produced by the waveform generator or generators, said control means feeding each radiating element with a transmit signal, the radiating elements being controlled for simultaneously carrying out electronic scanning of the transmit beam in elevation and for coloured transmission in elevation.

In one embodiment, when the transmit antenna comprises P linear arrays, the control means:

control the transmit signals so that each linear array produces a transmit beam along an eigendirection, the set of transmit beams produced being angularly offset in elevation; and comprise switches for switching the transmit signals to each of the P linear arrays in succession, the electronic scanning at transmission being obtained by switching the signal supply for the P arrays, the transmit beams of which are directed in P separate directions.

For example, the receive system comprises at least:

a linear array of radiating elements directed along a direction orthogonal to the linear arrays of the receive system; and processing means producing a receive beam by digital beam-forming in azimuth.

In one particular embodiment, the transmit system comprises at least two waveform generators, a first waveform generator delivering a signal at a first frequency F1 and a second waveform generator delivering a signal at a second frequency F2, each transmit array being split into two subarrays, the radiating elements of the first subarray being fed with the signal at the first frequency F1 and the radiating elements of the second subarray being fed with the signal at the second frequency F2, coloured transmission being obtained by transmitting over the first subarray at the first frequency F1 and by transmitting over the second subarray at the second frequency F2.

In this embodiment, the processing means of the receive system calculate for example, in the elevation plane, a sum channel $\Sigma$ and a difference channel $\Delta$ according to the single-pulse technique on the basis of the signals received, on the one hand, at the first frequency F1 and, on the other hand, at the second frequency F2.

In one particular embodiment, a radar according to the invention detects and locates a target in at least two steps:

in a first step, the radar detects a possible target with a maximum detection sensitivity and measures at least the closing velocity of the target moving towards the radar; and in a second step, when a target is detected, the radar measures the direction $\psi$ and the distance R of the target.

For example, the detection of a target uses very high-resolution spectral analysis followed by long non-coherent integration, these two characteristics being adapted to targets in a collision path.

Advantageously, a radar according to the invention uses, for example, two waveforms, a wave generator delivering two waveforms, a first waveform being adapted to high-speed targets located in Doppler frequency mode or in distance measurement mode in the presence of thermal noise, the second, reduced-range waveform being adapted to slow-moving targets that can be detected against a ground clutter background. For example, the first waveform is a continuous sinusoidal wave.

In one possible embodiment, the first waveform uses, as colour transmit waveform, at least two continuous waves frequency-shifted by k/T, where T is the Doppler integration time and k is a non-zero relative integer.

For example, the first waveform uses, on receive, as weighting window, Fourier transforms of polynomials of sine or cosine functions of any order.

The ambiguity in angle and distance measurements resulting from the use of the first colour transmit waveform is resolved, for example, by transmitting sinusoidal waves spaced apart by a plurality of frequency differences.

For example, for the first waveform, frequency differences $\Delta F$ between transmit arrays of opposite signs are used. These frequency differences have for example substantially the same absolute value.

In one particular embodiment, the resolution of the ambiguity in the angle and distance measurements, in respect of the first waveform, firstly takes place by resolving the distance ambiguity rank by using the plurality of frequency differences. The resolution of the ambiguity in the angle and distance measurements, in respect of the first waveform, is performed, for example, in the least-squares sense when the distance ambiguity rank is resolved.

In one possible embodiment, the second waveform is a pulsed sinusoidal wave.

For example, the coloured transmission of the second waveform uses the transmission of at least two pulsed sinusoidal carrier waves of frequencies F1, F2 which are frequency-shifted by k/T where T is the Doppler integration time and k is a non-zero relative integer.

In another possible embodiment, the coloured transmission of the second waveform uses the transmission of at least two pulsed sinusoidal carrier waves frequency-shifted by PRF/q, where PRF is the pulse repetition frequency and q is a non-zero positive integer, the parameter q being for example equal to 2.

Advantageously, other examples of transmit colour may be used.

The coloured transmission of the second waveform may use the transmission of at least two pulsed sinusoidal carrier waves frequency-shifted by substantially twice the Doppler frequency spread of the ground clutter.

The coloured transmission of the second waveform may use the transmission of at least two pulsed sinusoidal carrier waves frequency-shifted by substantially twice the maximum Doppler frequency of the ground clutter along the axis of the aircraft carrying said radar device.

Since the receive signals are transposed in the frequency domain by an FFT (Fast Fourier Transform), the coloured transmission of the second waveform can use the transmission of at least two pulsed sinusoidal carrier waves frequency-shifted by a frequency difference $\Delta F$, the sign of this frequency difference being switched from one FFT sequence to the next.

Since the receive signals are transposed in the frequency domain by an FFT (Fast Fourier Transform), the coloured transmission of the second waveform can use the transmission of at least two pulsed sinusoidal carrier waves frequency-shifted by a frequency difference $\Delta F$, the absolute value of this frequency difference being switched from N FFT sequences to N FFT sequences, the number N being for example equal to 2.

The coloured transmission of the second waveform may use the transmission of at least two pulsed sinusoidal waves modulated by orthogonal phase codes. The coloured transmission of the second waveform uses, for example, the transmission of at least two pulsed sinusoidal waves modulated by orthogonal phase codes obtained by time reversal from one relative to the other.

The coloured transmission of the second waveform may use the transmission of at least two pulsed sinusoidal waves modulated by identical but time-reversed Barker codes.

For example, the second waveform uses, on receive, as weighting window, Fourier transforms of the any-order polynomials having sine or cosine functions as variables.

BRIEF DESCRIPTION OF THE DRAWINGS

Other features and advantages of the invention will become apparent from the following description given in conjunction with the appended drawings which show.

DETAILED DESCRIPTION

Figure 1:
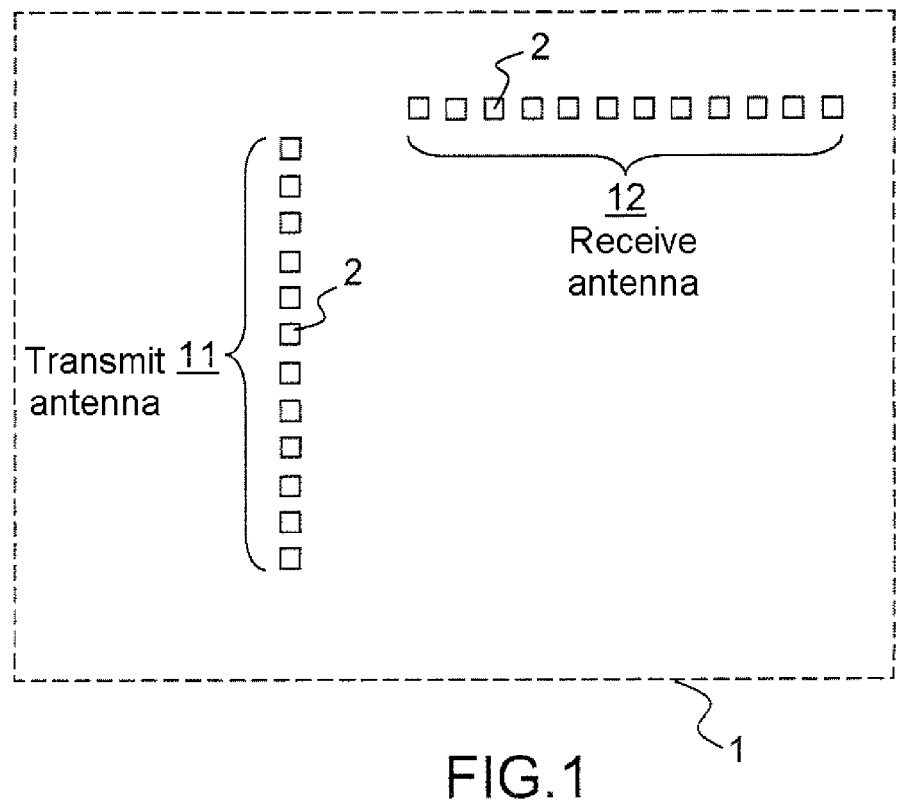
FIG. 1, the principle of an antenna system used in a radar according to the invention.

FIG. 1 illustrates the principle of an antenna system used in a radar according to the invention. This system comprises two arrays 11, 12 of radiating elements 2, each array forming an elementary source on transmit and an elementary receiver on receive. They are produced by means of one and the same technology, consisting for example of metal patches.

These two arrays 11, 12 are linear and mutually orthogonal. One array, namely 11, is used for transmission and the other array, namely 12, is used for reception. More particularly, the first array 11 is used to focus the antenna beam, on transmit, in a plane, by digital beam forming. The second array 12 is used to focus the antenna beam, on receive, in the plane orthogonal to the previous plane, again by digital beam forming.

Because of the required respective coverage ranges, namely ±110° in azimuth and ±15° in elevation, at least one vertical array is used in transmit and at least one horizontal array is used in receive. In its simplest form as shown in FIG. 1, the antenna array system 1 therefore comprises an array 11 in the form of a vertical column for transmission and an array 12 in the form of a horizontal row for reception. The arrays 11, 12 may be far apart and placed in any way whatsoever provided that the aiming directions of the radiating elements 2 are close and their radiation patterns adjacent.

Advantageously, the antenna arrays 11, 12 may be a printed circuit, thus achieving a low production cost.

Figure 2:
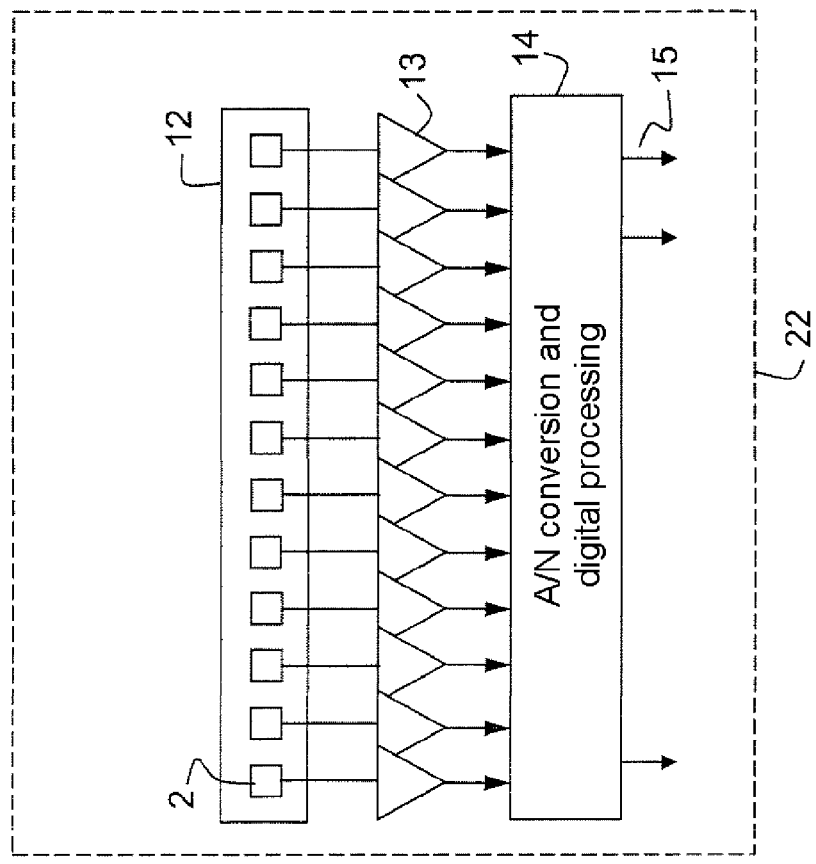
FIG. 2, an exemplary embodiment of a radar according to the invention having more particularly the transmit part and the receive part.
Figure 2:
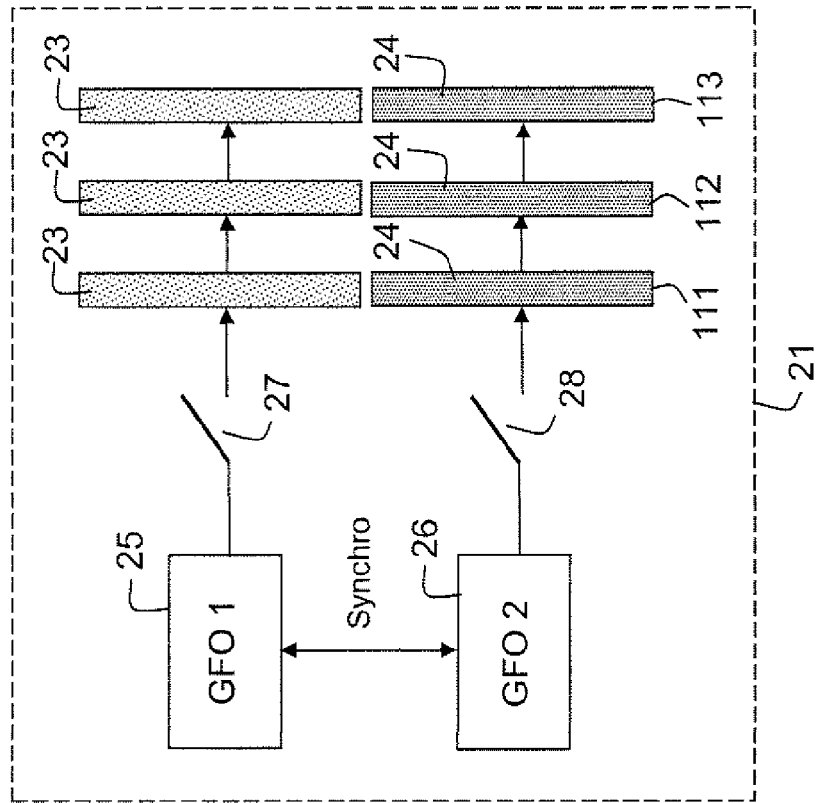

FIG. 2 illustrates an exemplary embodiment of a transmit/receive system for a radar according to the invention, using an antenna system according to the principle shown in FIG. 1. The transmit part 21 comprises for example three linear transmit arrays 111, 112, 113 of the type shown as 11 in FIG. 1. These arrays are electronically switched by switches 23, 24. Each array is divided into two subarrays 23, 24 forming for example the top part 23 and the bottom part 24 when the antenna is placed so as to be substantially vertical. The first subarrays 23 are for example fed with a sinusoidal signal having a first frequency F1 and the second subarrays 24 are for example fed with a sinusoidal signal having a second frequency F2. The signals are delivered by waveform generators 25, 26 via power amplifiers (not shown). Switches 27, 28 are used to switch the signals coming from the generators 27, 28 to one array or the other. A pair of switches is assigned to each array 111, 112, 113, only one pair of switches being shown in FIG. 2. A very simple electronic scan is thus carried out using the various linear arrays oriented differently in azimuth and fed in succession via the switches.

The transmission is coloured for carrying out the MIMO principle with N simple signals to be generated. In the example shown in FIG. 2, for a waveform intended for long-range detection, the signals are simple continuous sinusoids at the frequencies F1 and F2, i.e. N=2. This colouring of the space makes it possible to produce an angular measurement system, on transmit, of the "single-pulse" type, as will be shown later.

A radar according to the invention also includes processing means (not shown) which perform calculations for detecting and locating targets depending on the operating modes that will be described later.

Figure 3:
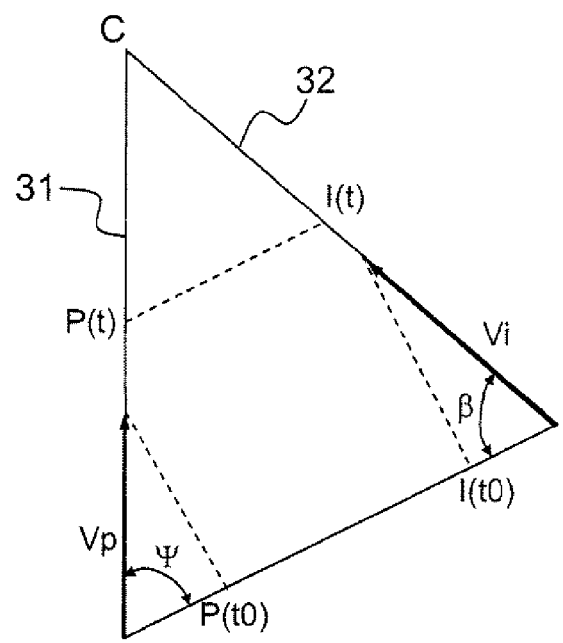
FIG. 3, an illustration of an example of a potential collision or near-collision path of a platform carrying a radar according to the invention with a potential target.

FIG. 3 illustrates an example of a collision or near-collision path. A point P represents a platform moving with the velocity $\vec{V}p$, a point I representing an intruder, namely the target, moving at the velocity $\vec{V}i$. The position of the points P and I depends on the time t—in FIG. 3 these points are shown at a time t0. The point C represents the point of collision.

A necessary condition for collision is that the straight line PI must lie in a plane formed by the two velocity vectors. In other words, the half-lines 31, 32 with respective origins P and I formed by the velocity vectors $\vec{V}p$ and $\vec{V}i$ respectively must have a non-zero intersection.

As regards the sufficient condition for collision, if the above condition is fulfilled, there will be a collision in the plane formed by the velocity vectors $\vec{V}p$ and $\vec{V}i$ if the following equation is satisfied:

$$Vp \sin \psi = Vi \sin \beta \tag{1}$$

where $\psi$ and $\beta$ are the angles between the segments PI and PC and between the segments PI and IC respectively, $\psi$ being the azimuth angle at which the target I is seen from the platform P.

A target on a collision path is characterized notably by the following points being verified:
the angle of observation of the target is invariant over time;
the relative radial velocity RRV is constant and positive;
the RRV field is limited and depends on the angle of observation; and
the aspect angle of the target is constant.

If $\vec{U}$ is the director vector of the target in a reference frame associated with the velocity vector $\vec{V}p$ of the platform, the condition for the observation angle of the target to be invariant over time is:

$$\frac{d(\vec{Vp} \cdot \vec{U})}{dt} = 0.$$

Expressing $\vec{U} = \begin{pmatrix} u = \cos\psi\cos\theta \\ v = \sin\psi\cos\theta \\ w = \sin\theta \end{pmatrix}$, where: $\vec{Vp} \equiv \begin{pmatrix} Vp \\ 0 \\ 0 \end{pmatrix}$, the necessary and sufficient condition for collision is:

$$\dot{\psi} \sin\psi \cos\theta + \dot{\theta} \cos\psi \sin\theta = 0 \quad (2)$$

In the general case, the above condition requires coordination of the vertical and horizontal angular velocities with the angular positions $\psi$ and $\theta$. This is not very probable under aerial navigation conditions obeying certain rules—it would in fact be necessary for there to be a rotation in the plane (P,C,I). In these circumstances, a simpler sufficient condition is expressed by:

$$\frac{d\Psi}{dt} = 0 \quad (3)$$

and $$\frac{d\theta}{dt} = 0$$

In this case, for the relative radial velocity RRV to be constant and positive, on closing, a necessary and sufficient condition for collision is:

$$\frac{dRRV}{dt} = 0 \quad (4)$$

and $$RRV > 0$$

The time before collision can therefore be calculated from the equation:

$$T = \frac{R}{RRV}.$$

The relative radial velocity RRV field is limited and depends on the angle of observation: given that $RRV=Vp \cos\psi+Vi \cos\beta$, this equation may be expressed, as a collision condition, as:

$$RRV = Vp \cos\psi \pm \sqrt{Vi^2 - Vp^2 \sin^2\psi} \quad (5)$$

The equation $RRV=Vp \cos\psi - \sqrt{Vi^2-Vp^2\sin^2\psi}$ has a solution with a positive RRV, and therefore in the event of a collision, only if $Vi<Vp$. This corresponds to the platform P catching the target I.

Figure 4:
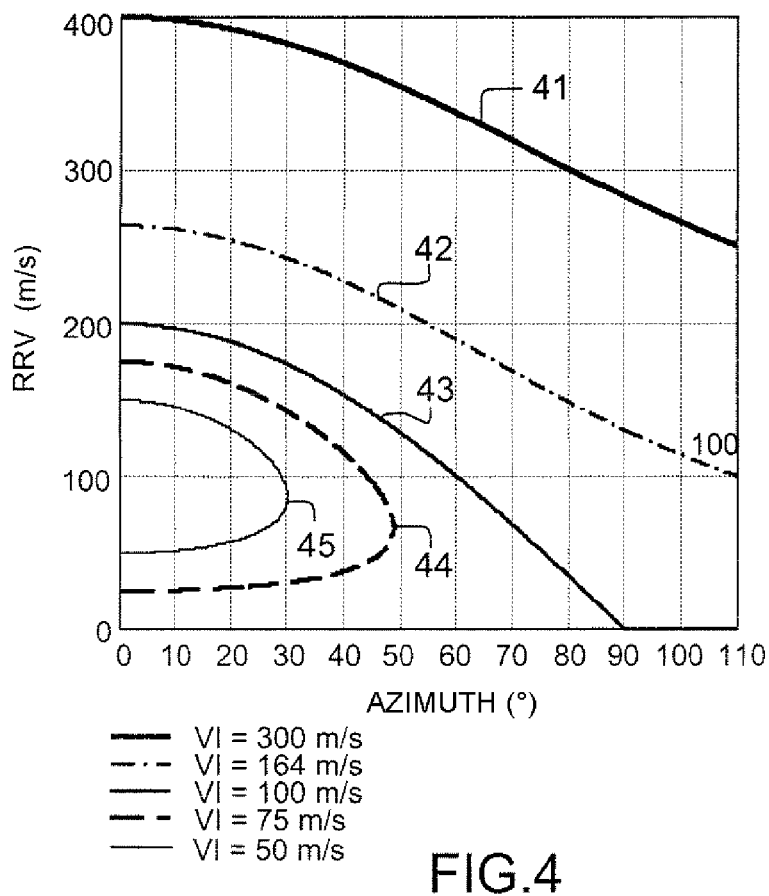
FIG. 4, a presentation of accessible collision loci for various target velocities.

FIG. 4 shows, by curves representative of equation (5), possible collision loci for various target velocities, a locus being defined by the (RRV, $\psi$) pair, the loci being parameterized by the velocity Vi of the target. Curves 41, 42, 43, 44 and 45 represent the velocity RRV as a function of the azimuth angle in accordance with equation (5) above. Each curve corresponds to a target velocity Vi.

FIG. 4 shows the following elements:

for "fast-moving" targets with velocities between the maximum velocity, for example 300m/s, and up to $Vi > Vp\sqrt{2(1-\cos\psi_{MAX})}$, i.e. 164 m/s for Vi=100 m/s and $\psi_{MAX}$=110°, detection is always "exo-clutter", that is to say the target velocity range in which a conventional MTI Doppler analysis, known to those skilled in the art, systematically places the target outside the Doppler zone of the ground clutter when a waveform with no velocity ambiguity is used. This range corresponds more to fast-moving targets possibly coming into collision with the platform;

for any target such that $Vi > Vp\sqrt{2(1-\cos\psi_{MAX})}$, detection is exo-clutter for low azimuth values and "endo-clutter" for high azimuth values. The endo-clutter transition point corresponds to an azimuth value of $\psi_C$=arccos $$\left(1 - \frac{Vi^2}{2Vp^2}\right);$$

and for any target slower than the platform, no collision can take place beyond an azimuth value of 90°. Even on targets of very low Vi, there are always collision configurations at low azimuth values.

However, it is found that the reduction in the RRV range with the angle is not very sensitive. This feature provides little in terms of the possibility of raising the detection PFA and consequently in terms of sensitivity improvement, which is at best around half a dB.

The fact that the aspect angle of the target is constant stems from the collision condition of equation (1), reflected in a very low fluctuation in the radar cross section RCS of targets on a collision path. This has the following advantages and disadvantages:

an advantage in that a long Doppler integration time can be used for dealing with targets on a collision course; but a disadvantage as, if the target is at an unfavourable angle from the point of view of its RCS, this state will persist, making it desirable to use waveforms with transmit frequency diversity to force the decorrelation of the target RCS.

In a preferred embodiment, the invention employs two main waveforms:

a first waveform for fast-moving targets that are "exo-clutter" in terms of Doppler frequency and of long range; and a second waveform for targets that are "endo-clutter" and/or of short range.

The criterion for using one or the other waveform is based, among other factors, on the velocity of the platform and that of the intended target.

In the case of the first waveform, the radar transmits at least two mutually orthogonal continuous sinusoidal waves during a processing cycle of duration T. In the exemplary embodiment shown in FIG. 2, two waves are transmitted, one at the frequency F1 and the other at the frequency F2, the signal at F1 being transmitted by the first waveform generator 25 and the signal at F2 being transmitted by the second waveform generator 26. For advantageous reasons that will be expounded later, each processing cycle is relatively long, for example around 50 ms. This makes it possible to obtain a very high Doppler frequency separating power, typically less than 1 m/s in X-band.

The signals transmitted at F1 and F2 towards the target are separated on receive by their orthogonality property. As will be seen in the description of the implementation, this separation is advantageously achieved by an FFT over the preceding duration T, since it is possible to group the channel separation and the Doppler filtering within the same operator.

If the analysis window is not weighted, the orthogonality criterion is:

$$|F_1-F_2|=k/T \text{ where } k \text{ is a natural integer greater than 1} \quad (6)$$

This amounts to placing F2 in the "zeros" of the FFT of the F1 signal over the duration T, and vice versa. In practice, the dynamics of the signals to be processed require the temporal sequence of duration T before analysis to be weighted. This weighting modifies the orthogonality condition. In this regard, it is convenient to choose, as weighting window, an N-order "cosine" polynomial, this having the advantage of placing the F1 or F2 zeros of the FFT at positions that are integer multiples of 1/T. Such weighting windows W(i) are given by the following equation:

$$W(i) = \sum_{k=0}^{k=N} a_k \cos\left(2\pi k \frac{i}{N_{FFT}}\right) \quad (7)$$

in which $N_{FFT}$ is the number of samples of each F1 or F2 signal that are contained in the window of duration T. Such weighting polynomials are, for example, Hanning windows, Hamming windows, Blackmann windows, etc. or else "ad-hoc" windows. Such windows are well known to those skilled in the art.

The sampling frequency $F_{sam}$ must be an integer multiple of 1/T. Under these conditions, the orthogonality is verified if:

$$|F_1-F_2|=k/T \text{ where } k \text{ is a natural integer greater than } N+1 \quad (8)$$

This condition is valid if there are one or more targets in the same Doppler filters and if the distances between targets are very much less than c.T/2. On account of the high value of T in the present case (T=50 ms), this condition is always met since, on the one hand, the probability that there is more than one target per Doppler filter is very low given the Doppler resolution employed, and, on the other hand, the value c.T/2 is equal to 7500 km for T=50 ms.

Figure 5:
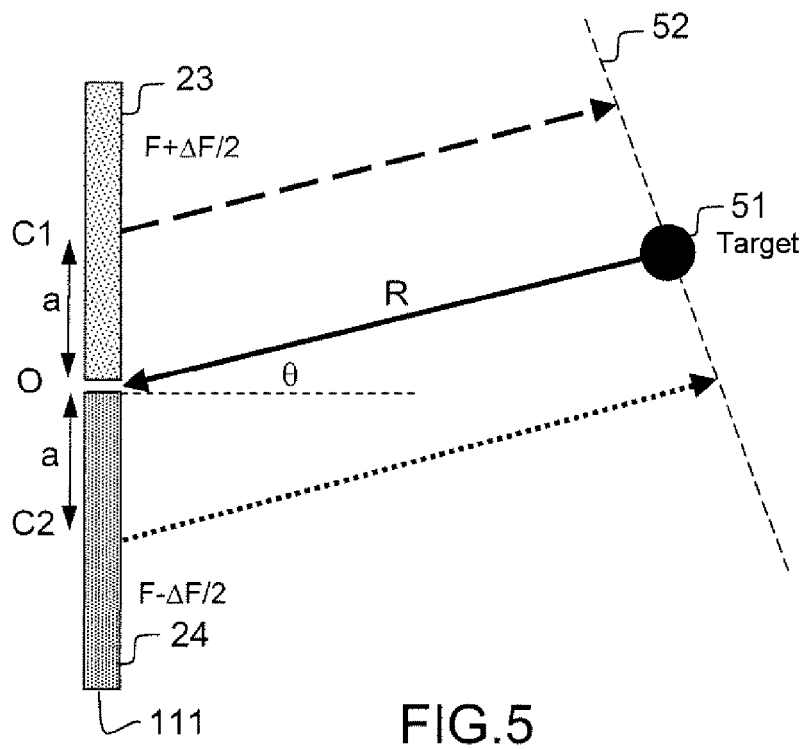
FIG. 5, a representation of the reconnoitring of a target by an antenna element of a radar according to the invention.

FIG. 5 shows an antenna element of the transmit part, more precisely it shows an array 111 of the transmit part pinpointing a target 51 at a distance R very much greater than 2a, a being the half-length of a subarray 23, 24. The array 111 is formed from two subarrays of the same length. If the middle of the transmit array 111 is the origin O, the phase centres C1 and C2 of the subarrays 23, 24 and the target director vector $\vec{U}$ have the respective coordinates:

$$\vec{OC_1} = \begin{pmatrix} 0 \\ 0 \\ a \end{pmatrix}$$

$$\vec{OC_2} = \begin{pmatrix} 0 \\ 0 \\ -a \end{pmatrix}$$

$$\vec{U} = \begin{pmatrix} u = \cos\psi\cos\theta \\ v = \sin\psi\cos\theta \\ w = \sin\theta \end{pmatrix}$$

The first subarray 23, fed by the first generator 25, transmits a continuous sinusoidal signal at the frequency F1=F+ΔF/2. The second subarray 24, fed by the second generator 26, transmits a sinusoidal signal at the frequency F2=F−ΔF/2. The step differences in the signals at F1 and F2 in the phase plane 52 correspond to transmit phase differences $\delta\varphi_{1,2}$ given by the following equations:

$$\delta\varphi_{1,2} = 2\pi\frac{F\pm\Delta F/2}{c}\vec{OC}_{1,2}\cdot\vec{U} = \begin{cases} -2\pi\dfrac{F+\Delta F/2}{c}a\sin\theta & (9) \\ 2\pi\dfrac{F-\Delta F/2}{c}a\sin\theta & (10) \end{cases}$$

equation (9) being applied in the case of the signal output from the first subarray 23 and equation (10) being applied in the case of the signal output from the second subarray 24.

The step differences depend only on the elevation angle θ, on the carrier frequency F, on the frequency differences ΔF and on the spacing a of the phase centres C1, C2 with respect to the origin O. For convenience, it is assumed that the phase centre of the receive device 22 is located at the point of origin O. Any other adjacent location would lead to the same practical result. Before any processing, to within a multiplicative coefficient, the signal received by an antenna 12 located at the point O, in the plane of the transmit antenna 111, is the sum of the following two terms $s_1(t)$ and $s_2(t)$:

$$s_1(t) = \exp\left[-2\pi j\frac{F+\Delta F/2}{c}(-a\sin\theta+2R(t))\right]\exp[2\pi j(F+\Delta F/2)t]$$

$$s_2(t) = \exp\left[-2\pi j\frac{F-\Delta F/2}{c}(+a\sin\theta+2R(t))\right]\exp[2\pi j(F-\Delta F/2)t]$$

The total received signal is $s(t)=s_1(t)+s_2(t)$ and is routed towards adapted filters, the purpose of which is, by profiting from the properties of the transmitted codes, to separate the components transmitted by each of the N subarrays 23, 24 of the transmit array. In the example shown in FIG. 2, N=2. This is because these N components have been mixed upon the reflections on the targets 51.

By performing the correlation—beating—with the signal at the central frequency F, the first part of the adapted filter is obtained, giving a signal S(tp) obtained by the following equation:

$$S(tp) = \frac{1}{T}\int_{tp}^{T+tp} s(\tau+tp)\overline{\exp(2\pi jF\tau)}d\tau \quad (11)$$

The time "tp" corresponds to the propagation path on an echo of the distance R=ctp/2.

It is assumed that the sinusoidal signals at F1 and F2 meet the orthogonality condition over the duration T perfectly. Consequently, if R is a function of time t, the following equation (12) is satisfied:

$$S(t) = S_1(t) + S_2(t) \begin{cases} S_1(t) = \exp\left(+2j\pi\frac{\Delta F}{2}t\right)\exp\left[-2\pi j\frac{F+\Delta F/2}{c}(-a\sin\theta + 2R(t))\right] \\ S_2(t) = \exp\left(-2j\pi\frac{\Delta F}{2}t\right)\exp\left[-2\pi j\frac{F-\Delta F/2}{c}(+a\sin\theta + 2R(t))\right] \end{cases}$$

The two components of S(t) may be written according to the following equations (13) and (14):

$$\begin{cases} S_1(t) = \exp\left(+2j\pi\frac{\Delta F}{2}t\right) \times \exp\left[\frac{-2\pi j}{c}\left(2FR(t) - \frac{\Delta F}{2}a\sin\theta\right)\right] \times \\ \qquad \exp\left[\frac{-2\pi j}{c}(-Fa\sin\theta + \Delta FR(t))\right] \\ S_2(t) = \exp\left(-2j\pi\frac{\Delta F}{2}t\right) \times \exp\left[\frac{-2\pi j}{c}\left(2FR(t) - \frac{\Delta F}{2}a\sin\theta\right)\right] \times \\ \qquad \exp\left[\frac{-2\pi j}{c}(Fa\sin\theta - \Delta FR(t))\right] \end{cases}$$

Then, by setting $R(t)=R_0-Vt$ and $\lambda=c/F$:

$$\begin{cases} S_1(t) = \exp\left[+2j\pi\left(\frac{\Delta F}{2}\left(1+\frac{2V}{c}\right) + \frac{2V}{\lambda}\right)t\right] \times \\ \exp\left[\frac{-2\pi j}{c}\left(2FR_0 - \frac{\Delta F}{2}a\sin\theta\right)\right] \times \exp\left[\frac{-2\pi j}{c}(-Fa\sin\theta + \Delta FR_0)\right] \\ S_2(t) = \exp\left[+2j\pi\left(\frac{-\Delta F}{2}\left(1-\frac{2V}{c}\right) + \frac{2V}{\lambda}\right)t\right] \times \\ \exp\left[\frac{-2\pi j}{c}\left(2FR_0 - \frac{\Delta F}{2}a\sin\theta\right)\right] \times \exp\left[\frac{-2\pi j}{c}(Fa\sin\theta - \Delta FR_0)\right] \end{cases}$$

The $$\left(1+\frac{2V}{c}\right) \text{ and } \left(1-\frac{2V}{c}\right)$$

terms represent the minute variations in the Doppler effect obtained, on the one hand, on a signal at $F+\Delta F/2$ and, on the other hand, on a signal $F-\Delta F/2$. With the settings $$\left(1 \pm \frac{2V}{c}\right) \cong 1 \text{ and } Fd = \frac{2V}{\lambda},$$

then noting that the constant phase term $$\frac{-2\pi}{c}\left(2FR_0 - \frac{\Delta F}{2}a\sin\theta\right)$$

is the same on both signals, and therefore is not involved in the differential analysis that follows, it is possible to rewrite equation (12) as the following equation (12'):

$$S(t) = S_1(t) + S_2(t) \begin{cases} S_1(t) \cong \exp\left[\begin{array}{c}\text{Doppler effect + effect of the }\Delta F\text{ difference} \\ \text{between the two transmitted signals} \\ \hline +2j\pi\left(\frac{\Delta F}{2} + Fd\right)t\end{array}\right] \times \\ \exp\left[\begin{array}{c}\text{Phase at the origin representing coupling} \\ \text{between the distance and the angle} \\ \hline -2j\pi\left(-\frac{a\sin\theta}{\lambda} + \frac{\Delta FR_0}{c}\right)\end{array}\right] \\ S_2(t) \cong \exp\left[+2j\pi\left(\frac{-\Delta F}{2} + Fd\right)t\right] \times \\ \exp\left[-2\pi j\left(\frac{a\sin\theta}{\lambda} - \frac{\Delta FR_0}{c}\right)\right] \end{cases}$$

In the case of perfect orthogonality, a Fourier transform, which follows this correlation, completes the filtering adapted to each of the signals $S_1$ and $S_2$ and makes it possible to separate them for subsequent processing. After this Fourier transform, a pair of lines is obtained with the following frequencies:

$$f1 = \frac{\Delta F}{2} + Fd$$

$$f2 = -\frac{\Delta F}{2} + Fd$$

Knowing $\Delta F$, it is easy to measure the Doppler effect (and therefore the closing velocity RRV) unambiguously. Each of these two lines at f1 and f2 "carries" the following phase information:

$$\phi F_1 = -2\pi\left(-\frac{a\sin\theta}{\lambda} + \frac{\Delta FR_0}{c}\right)$$

$$\phi F_2 = -2\pi\left(\frac{a\sin\theta}{\lambda} - \frac{\Delta FR_0}{c}\right)$$

The "useful" information is contained in the differential phase, obtained for example by calculating the argument of the covariance $S_1\overline{S_2}$:

$$\Delta\phi F = 4\pi\left(\frac{a\sin\theta}{\lambda} - \frac{R_0\Delta F}{c}\right) \qquad (14')$$

where $\lambda=c/F$.

In addition to the "conventional" ambiguity in the measurement of the phase modulo $2\pi$, an ambiguity is found between the distance and the angle. The influence of the distance may be varied by acting on the frequency difference $\Delta F$. To give an example, the following numerical example may be taken:
F=10 GHz;
a=0.06 m;
$\Delta F$=50 kHz, satisfying the orthogonality condition.
Let:

$$\frac{\Delta\phi F}{2\pi} = 4\sin\theta - 0.33R_{KM}.$$

For a zero distance, the angular measurement is not ambiguous over sin θ=±0.125, i.e. over ±7°. For a given angle, the distance ambiguity is 3 km.

In another numerical example:

F=10 GHz;
a=0.06 m
ΔF=80 Hz, satisfying the orthogonality condition.

Let:

$$\frac{\Delta \phi F}{2\pi} = 4\sin\theta - 0.0005 R_{KM}.$$

For a zero distance, the angular measurement is, as above, not ambiguous over sin θ=±0.125. For a given angle, the distance ambiguity is 1875 km. However, at 10 km, the bias is 1.8° and has to be corrected.

Sum Σ and difference Δ channels may advantageously be formed on transmit in standby phase.

It should be noted in a first case that, when the coupling between distance and angle is strong, it is not possible to form sum and difference channels (Σ, Δ) since such channels are formed by coherent addition and subtraction of the signals $S_1$ and $S_2$. Under these conditions, only less than one half of the differential phase ambiguity range (−π, +π) may be used.

In a second case, the formation of the Σ and Δ channels is, however, desirable—coherent summation—when the coupling between distance and angle is very weak. This makes it possible notably:

to improve the detection sensitivity by virtue of the coherent summation; and to benefit from any weighting of the transmit array in order to reduce the side lobes in elevation of the antenna system in its entirety—thus the receive array has little or no vertical selectivity.

The weighting is applied globally to the two transmit subarrays. The separate use of signals coming from each subarray, as in the first case, cannot benefit from this weighting.

For these two reasons, it is desirable for the standby to take place with a waveform that allows formation of the Σ and Δ channels, so as to avoid detecting high RCS echos by the side lobes of the antenna device. In theory it would be possible to form a plurality of (Σ,Δ) pairs and to benefit from the weighting, irrespective of the waveform in the first case or in the second case. However, this would require the feed to each element 2 of each subarray to be controlled. This solution would be expensive and is not adopted here for this reason.

However, in tracking phase corresponding to the first case, when the distance—angle coupling is strong, the system works in "interferometric" mode so as to exploit the entire differential phase ambiguity range (−π, +π).

Figure 6A:
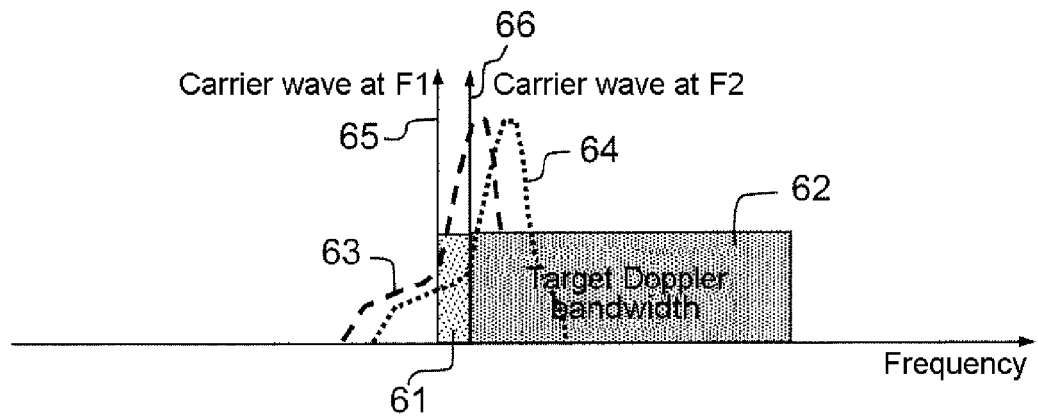
FIGS. 6a and 6b, examples of ground clutter and Doppler echo spectral configurations respectively for small and large frequency differences between two transmit frequencies F1 and F2.
Figure 6B:
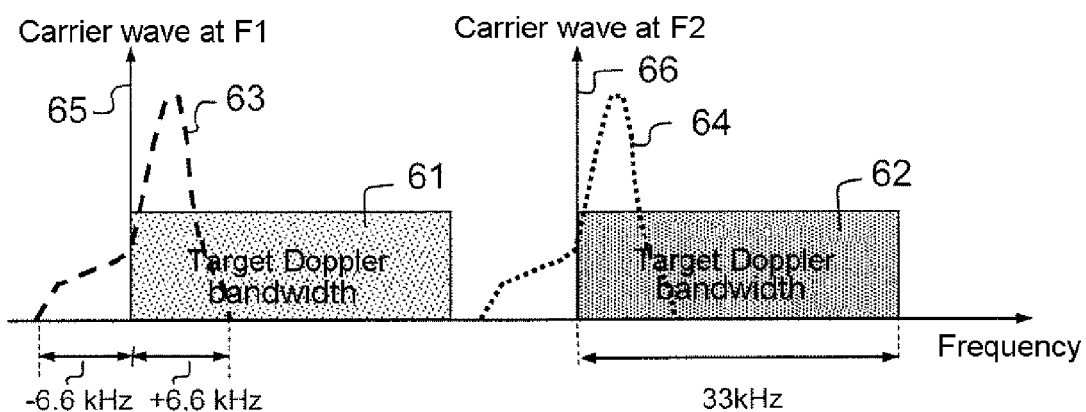

As an example, FIGS. 6a and 6b illustrate spectral configurations respectively when the frequency difference ΔF, between the frequencies F1 and F2 respectively, is very much less than 1 kHz and greater than 33 kHz. The Doppler field of the targets 61, 62 and of the ground clutter 63, 64 is convoluted by each of the carrier waves 65, 66 at frequencies F1 and F2. A first clutter 63 and a first Doppler band 61 correspond to the carrier wave of frequency F1 transmitted by the first subarray 23, and a second clutter 64 and a second Doppler band 62 correspond to the carrier wave of frequency F2 transmitted by the second subarray 24.

In the example in question, the total band of the signals, including the target and clutter echos, occupies 500 m/s, i.e. 33 kHz for a platform speed Vp=100 m/s and a target speed Vi<300 m/s. The ground clutter occupies the ±100 m/s band for Vp=100 m/s, i.e. ±6.6 kHz. Two choices of frequency difference are possible for this first "exo-clutter" waveform.

FIG. 6a illustrates the first choice in which the frequency difference ΔF is much smaller than the ground clutter band so as not to increase the "endo-clutter" zone unnecessarily. ΔF values of the order of one hundred or a few hundred Hz may then be chosen.

FIG. 6b illustrates the second choice in which the frequency difference ΔF is greater than the total band of the target and clutter echos. In the example of FIG. 6b, a value of greater than 40 kHz, therefore greater than the 33 kHz total band, is chosen.

It should be noted that the first configuration, illustrated by FIG. 6a, results in weak coupling between distance and angle and allows only target echos outside the clutter zone to be separated whereas, on the contrary, the coupling is very strong in the second configuration, illustrated by FIG. 6b, but allows all, clutter and target, signals to be separated.

The case of a very small frequency difference ΔF, for example 80 Hz, is a configuration in which only the Doppler frequency and the angle are measured unambiguously, the distance measurement however being impossible.

Advantageously, the invention uses, for example:

the first, standby phase configuration for obtaining sensitive detection and the relative radial velocity RRV and the angle ψ of the target; and the second, tracking phase configuration for measuring distance.

It is possible, in standby phase, to use a zero frequency difference ΔF. In this case only a SUM Σ channel is formed and then only the relative radial velocity RRV is measured in standby mode.

Typically, the target exploration and tracking time in the "long range, high velocity" region, corresponding to this first waveform, is of the order of one second, for example 900 milliseconds, to ensure that dangerous targets are correctly tracked. This region is for example subdivided into three elevation subregions, each subregion being covered by one transmit array 111, 112, 113 as illustrated by FIG. 2. For this purpose, the antenna beams are mutually offset. The first array 111 covers for example the −15° to −5° subregion, the second array 112 covers for example the −5° to +5° subregion and the third array 113 covers for example the +5° to +15° subregion. Each subregion is therefore explored and the targets tracked, for example for about 300 milliseconds. For each subregion, the total observation time may be subdivided into, for example, six Doppler integration intervals each of about 50 milliseconds.

Figure 7:
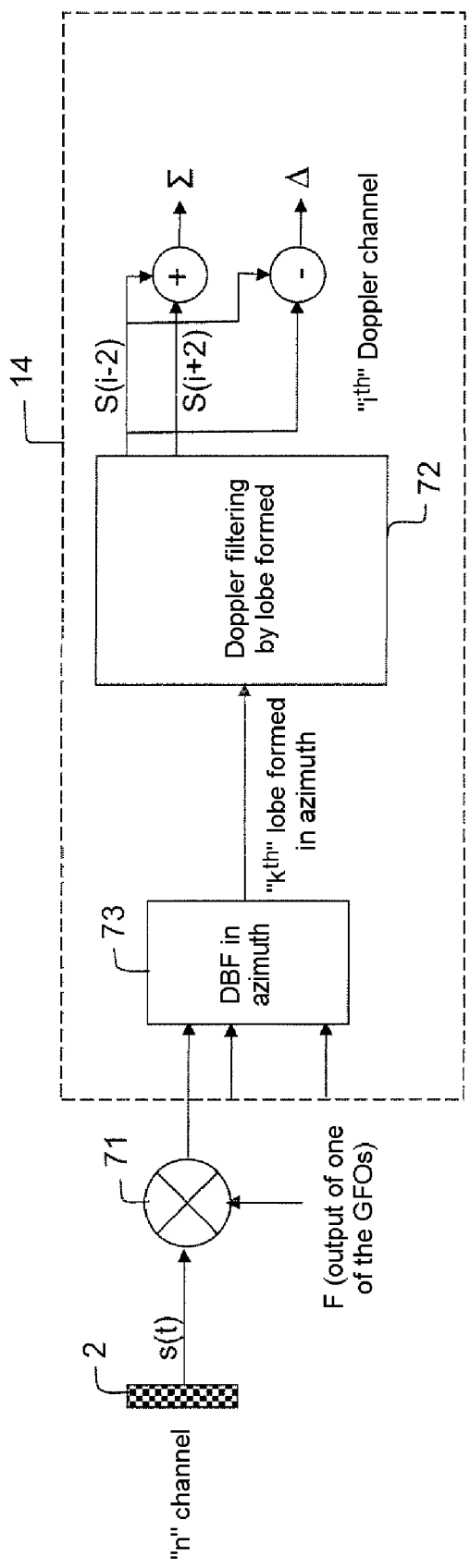
FIG. 7, a block diagram showing one possible mode of operation of the receive part in standby mode.

FIG. 7 illustrates, in block diagram form, one possible receive operation in standby mode. The signal s(t) received on a receive channel, represented by a source 2 of the receive array 12, is mixed by a microwave mixer 71 with the central frequency F coming for example from one of the waveform generators. Only one channel is shown, the processing unit 14 being the same for the other channels.

In this block diagram, the separation of the channels on transmit and the Doppler filtering are combined in the "Doppler filtering" FFT unit 72, as specified by the set of equations (15) below. This separation unit is preceded by the "DBF in azimuth" unit 73. Other architectures are possible however. In particular, the processing operations are linear and may be switched over, the DBF unit 73 and the Doppler filtering unit 72. The choice of the order in which the operations are carried out is above all dictated by necessary computing power considerations. In fact, depending on the order chosen, unnecessary configurations may be excluded and the computing resource spared. The rest of the description refers, however, to this block diagram illustrated in FIG. 7.

Figure 8:
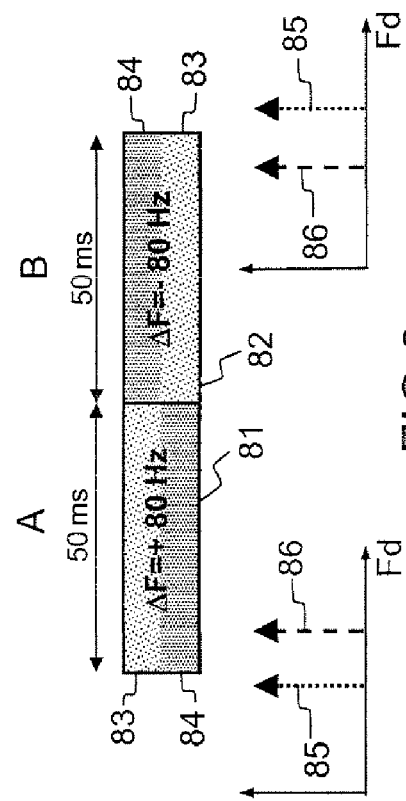
FIG. 8, an example of a waveform pattern for a first possible waveform.

An example of a waveform pattern in standby mode is illustrated in FIG. 8. The waveform in standby mode, when no target acquisition or tracking has been established, consists in continuously repeating the transmission of the elementary pattern illustrated by FIG. 8.

This standby waveform pattern consists of a pair of sequences 81, 82 of about 50 ms, i.e. an elementary pattern of about 100 ms. Each sequence is formed by the transmission of two sinusoids, one sinusoid 83 transmitted at F1 applied to the first subarray 23 of the transmit antenna and another sinusoid 84 transmitted at F2 applied to the second subarray 24 of the transmit antenna. The difference between F1 and F2 is ΔF around an X-band carrier wave at the frequency F. The sign of the difference is reversed between the 1st FFT sequence and the 2nd FFT sequence. In the case of the standby waveform, and with the values indicated in the figure above, the presence of a target is characterized by two lines 85, 86 separated by four filters.

The sum Σ and difference Δ channels are formed in accordance with the following set (15) of equations:

$$\Sigma_A(i)=S_A(i+2)+S_A(i-2)$$

$$\Delta_A(i)=j(S_A(i+2)-S_A(i-2))$$

$$\Sigma_B(i)=S_B(i+2)+S_B(i-2)$$

$$\Delta_B(i)=-j(S_B(i+2)-S_B(i-2)) \quad (15)$$

in which the index i indicates the Doppler rank analysed, S(i) denotes the output signal of the ith Doppler filter and the indices A and B identify the first 81 and second 82 FFT sequence.

It is then possible to form an angular deviation operator in elevation based, for example, on the following equation:

$$\varepsilon(i) = \frac{\sum_A (i) \cdot \Delta_A(i) + \sum_B (i) \cdot \Delta_B(i)}{\sum_A^2 (i) + \sum_B^2 (i)} \quad (16)$$

It should be noted that the addition operation in the numerator tends to cancel out the bias due to the slight coupling between distance and angle. Actual target detection may take place, for example:
 either by a "2/2"-type criterion after having compared each power $\Sigma_A^2(i)$ and $\Sigma_B^2(i)$ with a detection threshold;
 or by directly comparing the sum of the powers $\Sigma_A^2(i)+\Sigma_B^2(i)$ with a detection threshold.

It is possible to transmit a waveform with no spatial coloration. This waveform amounts to transmitting the same signal on each half of the antenna. Thus, only a single sum Σ can be formed. In this case, only the target velocity can be detected, the angle measurement not being possible. However, it is conceivable to carry out SLS (side lobe suppression) processing in order to eliminate high RCS echoes received by the side lobes, by comparing the signals received on two adjacent elevation lines within the same Doppler neighbourhood.

Advantageously, the average carrier wave frequency F for the two sequences of a pattern is constant, so that the target remains within the same RCS fluctuation configuration, i.e. so as to obtain the same RCS on both FFTs.

Also advantageously, it is desirable to use frequency agility of a following 100 ms pattern to avoid remaining in an unfavourable configuration for addition of the target bright spots. This is because a target on a collision path is seen at a constant aspect angle, and therefore no decorrelation due to the relative movement of the target is expected.

The processing is carried out, after the DBF unit "formed lobe by formed lobe". Moreover, in order for a target to be integrated with the maximum sensitivity, its RRV must have varied by less than 1 m/s during the two sequences, i.e. 100 ms, this being the case for targets on a collision path.

If one considers 300 Doppler filters between 100 and 400 m/s, 12×3 beams sum Σ formed. The number 12 corresponds to the number of sources 2 of the receive array 12 and therefore to the number of independent beams that may be formed, and the number 3 corresponds to the number of elevation lines covered in succession with a total maximum cycle time of 1 s, referring to the embodiment shown in FIG. 2. The number of resolution cells observed per second is: 300×12×3×10=108× 103.

If one false alarm per hour is desired, the necessary PFA (probability of false alarm) is therefore 2.6×10−9 and the detection threshold is to be set at 12.6 times the average noise power, i.e. an S/N (signal/noise ratio) threshold of 11 dB.

Figure 9:
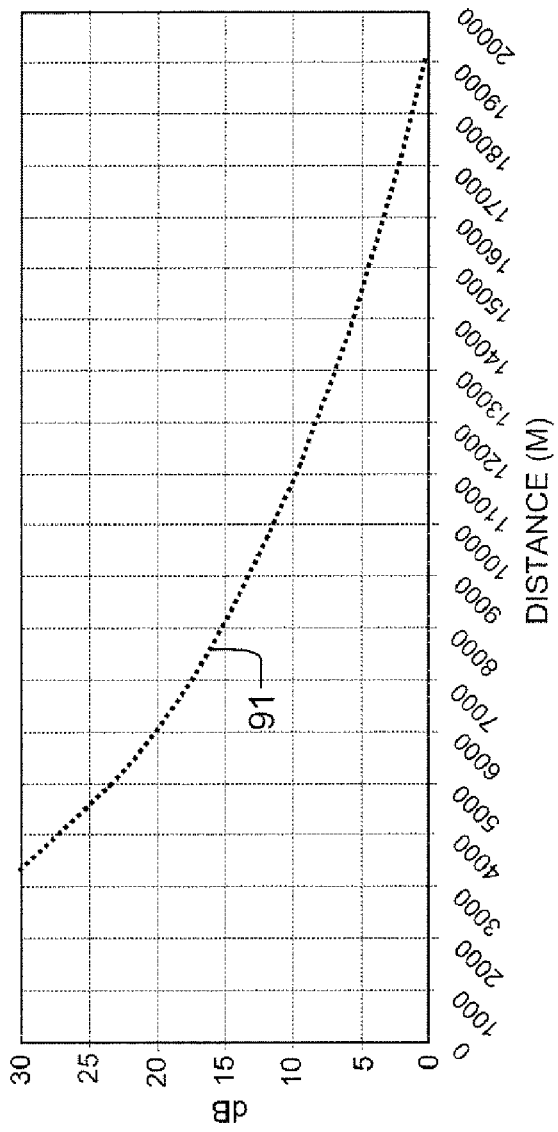
FIG. 9, an example of the signal-to-noise ratio as a function of the measured distance.

FIG. 9 shows, by way of example, the S/N ratio as a function of the distance, as output from a 50 ms FFT, on a 1 m2 fluctuating target according to the Swerling 1 model, this S/N ratio being represented by the curve 91.

The assumptions for separating the "fast-moving target" waveform from the "slow-moving target" waveform are for example the following:
 over 900 ms, 3 lines are scanned with the "fast-moving target" waveform, each line corresponding to the repetition of three 100 ms elementary patterns, i.e. 2 FFTs;
 over 450 ms, 3 lines are scanned with the "slow-moving target" waveform.

There are therefore three detection patterns for a given line, for a total cycle time of 1350 ms. The mean time between two elementary detection patterns, namely 100 ms, for a given elevation line is therefore:

$T_{REVISIT}$1350/3=450 ms.

The cumulative detection probability is calculated using this mean time assumption.

Figure 10:
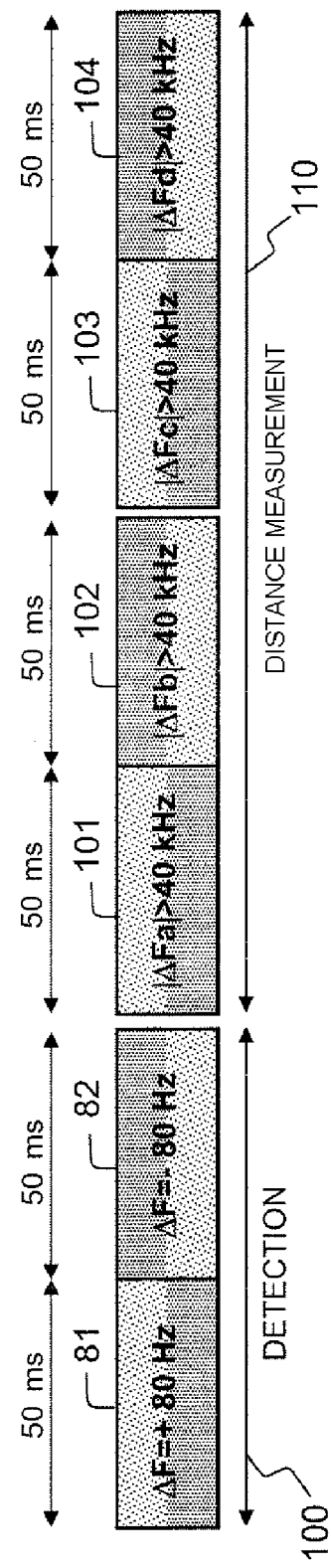
FIG. 10, another example of a waveform pattern for the first aforementioned waveform.

FIG. 10 illustrates the standby waveform, at the end of the detection phase and in the tracking acquisition phase. The figure illustrates a standby sequence 100 followed by a distance measurement sequence. During the standby sequence 100:
 the carrier wave has an agile frequency from one standby sequence to another;
 the RRV of the target is measured unambiguously; and
 the direction of the target (ψ, θ) is measured unambiguously and with no bias.

If a target is detected after this standby sequence 100, the following operations may for example be advantageously carried out:
 the transmission of the next two standby sequences, i.e. 2×(2×50 ms)=200 ms, is suppressed; and
 two standby sequences (200 ms) are replaced with four sequences 101, 102, 103, 104 of four FFT blocks, using high coloration ΔF values, which are greater than the total Doppler band (i.e. greater than about 40 kHz) but are all different.

These four FFT sequences, each lasting about 50 ms, and each using large and different ΔF values, are substituted for the two pairs 81, 82 transmitted in standby mode with a low ΔF value, 80 Hz in the example shown in FIG. 8.

Advantageously, the frequency agility is stopped during the transmission of these four FFT sequences, over a total time of 200 ms, so that the target remains in the same RCS fluctuation configuration as during its initial detection.

The distance measurement sequence is therefore characterized by:

a non-agile carrier wave, locked onto the carrier wave frequency of the preceding standby sequence;

the transmission of four sequences with different AF values;

the measurement of a "pseudo-distance" in the case of a single detection; and unambiguous distance measurement in the case of several detections.

Advantageously, the confirmation and the distance measurement are implemented only in a Doppler zone of a few filters and in the formed beam in which the initial detection took place. This is because only targets on a collision path are sought, therefore:

$$\Delta V_{RR} \approx -\frac{r_{\psi,\theta}^2}{R^3} V_{RR}^2 \quad |\Delta\sin\psi, \theta| = \left|\frac{r_{\psi,\theta}}{R^2} V_{RR}\Delta t\right| \quad (17)$$

A certain tolerance on the zero value must however be taken into account since targets on a collision course are sought, but also those on a near-collision course (security bubble). In azimuth, it is also sought to regulate the traffic separation problem. The tolerance on the zero value depends on two terms:

a term associated with the angle parameter estimation noise; and a parallax term, which is inversely proportional to a power of the distance.

Considering targets further away than 2 km, these tolerances are, excluding noise, given by the following equations giving the variation in RRV and the variation in angle:

$$\Delta V_{RR} \approx -\frac{r_{\psi,\theta}^2}{R^3} V_{RR}^2 \quad (17)$$

$$|\Delta\sin\psi, \theta| = \left|\frac{r_{\psi,\theta}}{R^2} V_{RR}\Delta t\right|$$

where $r_{\psi,\theta}$ is the collision margin or traffic separation gap along the horizontal or vertical axis, i.e. 500 feet for collision avoidance or vertical traffic separation, and 1500 feet for horizontal traffic separation.

At long distance, it is the horizontal traffic separation criterion $r\psi$=1500 feet which is predominant. At short distance, it is instead the near-collision avoidance criterion $r\psi,\theta$=500 feet which is taken into account.

Since the distance is unknown at initialization, this is arbitrarily considered to be 2000 metres, this being the lower limit of the distance domain in the case of the "fast-moving target" mode. Under these conditions, it is found that the variation in RRV is at most −0.8 m/s and the variation in angle is at most 8.5 milliradians.

Advantageously, and benefiting from the fact that only targets on collision paths are of interest (the most critical condition relating to horizontal traffic separation), it may be seen that detection in confirmation mode needs to be carried out:

only on 3 Doppler blocks centred around the block in which the initial detection took place; and only in an antenna lobe formed after DBF.

Under these conditions, it may be seen that a very low detection threshold, close to the noise level, could be appropriate if only the "false alarm on confirmation" aspect were of interest.

In fact, in the confirmation phase, a "detection" threshold is placed, not to guarantee a certain false alarm rate, but in order for the validated differential phase measurements not to be corrupted by prohibitive errors that could prevent the distance ambiguity from being resolved, as explained below.

As regards the general principle of the distance measurement, taking into account:

the $2\pi$ ambiguity on the differential phase measurements, which is equivalent to a distance ambiguity of around 3000 m; and the coupling between angle and distance in the differential phase measurement, irrespective of the way in which this is taken into account, three differential phase measurements are necessary for obtaining an unambiguous distance measurement since it is necessary to resolve:

not only the ambiguity between angle and distance, but also the ambiguity in the differential phase measurement modulo $2\pi$.

These three measurements may for example be:

an unambiguous angle measurement in standby phase and at least two ambiguous distance/angle and differential-phase measurements in what is called the "distance measurement" phase, i.e. over the last four 50 ms FFTs; or at least three ambiguous distance/angle and differential-phase measurements in said distance measurement phase.

Upon first detecting a target, only the first case is used. Once the target track has been opened, both cases may be employed.

After the four 50 ms confirmation sequences (i.e. after 200 ms in total), the situation may be one of the following cases:

case 1: no target redetection has taken place (however, this case is improbable—see later);

case 2: a single redetection (somewhat improbable case—see later);

case 3: at least two redetections.

Case 1:

An arbitrary distance, for example 2000m, is assigned to the target, this distance corresponding to the lower limit of the domain. The state vector is set as follows, the numerical values being given by way of example and S/N representing the signal-to-noise ratio:

$$\begin{pmatrix} RRV & \text{Unambiguous distance} = 2000 \text{ m} & S/N \ a = 0 \\ \text{Angles} & \text{Ambiguous distance } 1 = 2000 \text{ m} & S/N \ b = 0 \\ \text{Quality index} = 0 & \text{Ambiguous distance } 2 = 2000 \text{ m} & S/N \ c = 0 \\ \text{Event counter} = 1 & \text{Ambiguous distance } 3 = 2000 \text{ m} & S/N \ d = 0 \end{pmatrix}$$

The track remains "internal" to the radar and is not communicated to the navigation system.

If, during the scan cycle for the next elevation line, the same case occurs again, i.e.:

either the target is not detected again (during the phase in which the $\Delta F$ is small) nor is it detected at least twice during the distance measurement phase (during the phase in which the $|\Delta F|$ values are high), during the following observation sequence of the same elevation line (i.e. approximately one second later);

or a target is detected again (during the phase in which the AF value is low) but is not located in the "angle—RRV" tracking correlation domain;

or the target is detected again (during the phase in which the AF value is low) and correlates, but the distance measurement sequence is again fruitless, then the event counter is incremented by 1. When the event counter reaches a certain threshold, the track is abandoned. It is possible, within a safety principle, to transmit a prewarning to the navigation system.

Case 2:

This case provides a distance measurement, but the distance is ambiguous (because of the $2\pi$ ambiguity in the differential phase) since, during the detection sequence, the angle and the RRV were measured unambiguously. Applying equation (14') leads to the following distance estimate:

$$R = \frac{c}{2\Delta F}\left[\frac{2a\sin\theta}{\lambda} - \frac{\Delta\phi F}{2\pi}\right] \mathrm{mod} \frac{c}{2\Delta F} \qquad (17)$$

For a $\Delta F$ value of 50 kHz, the modulo term is equal to 3000 m. Accepting that three ambiguities are contained in the distance domain of the "long range" waveform, the state vector is set as follows:

$$\begin{pmatrix} RRV & \text{Unambiguous distance} = R & SNR \\ \text{Angles} & \text{Ambiguous distance } 1 = R + \frac{c}{2\Delta F} & 0 \\ \text{Quality index} = 1 & \text{Ambiguous distance } 2 = R + 2\frac{c}{2\Delta F} & 0 \\ \text{Event counter} = 1 & \text{Ambiguous distance } 3 = R + 3\frac{c}{2\Delta F} & 0 \end{pmatrix}$$

The SNR of the three non-detection cycles is set to zero. In practice, four estimators are opened with the four distance assumptions. It is possible, within a safety principle, to transmit a prewarning to the navigation system relating to the track corresponding to the shortest distance, together with an indicator specifying the distance ambiguity risk. If, during the next scan cycle, the same case occurs, the event counter is incremented by a value $\leq 1$. The track is abandoned when a certain threshold is exceeded.

Case 3:

This case provides an unambiguous distance measurement. It is sufficient for there to be two valid detections in four and to have a judiciously chosen set of $\Delta F$ values. The possible principles for resolving the distance ambiguity are discussed in the next paragraph.

An example of how the distance ambiguity is resolved, in a preferential solution in tracking initialization phase, is given below for a simplified case, ignoring the ambiguity in the differential phase. Given the measurement of the target angle $\theta$ coming from the detection sequence, equation (14') shows that each differential phase measurement allows an estimate of the distance modulo the distance ambiguity.

If the situation is limited to the first ambiguity, the following equations may be written, for example in the case of two valid differential phase measurements:

$$R_a = \frac{c}{2\Delta F_a}\left[\frac{a\sin\theta}{\lambda} - \frac{\Delta\phi F_a}{2\pi}\right]$$

-continued $$R_b = \frac{c}{2\Delta F_b}\left[\frac{a\sin\theta}{\lambda} - \frac{\Delta\phi F_b}{2\pi}\right]$$

With two measurements, it is possible to calculate, for example, a filtered estimate by taking the average of the two distances Ra and Rb. It is readily understood that if $\Delta F_b = -\Delta F_a$, any measurement error on the angle $\theta$ is eliminated.

Advantageously, it will be seen that it is beneficial to use AF values grouped in pairs of opposite signs and if possible absolute values that are similar or even the same (within a pair).

In a general case, as previously, detection in standby phase provides a direct estimate of the angle $\theta$ deduced from the single-pulse deviation, for example as indicated by equation (16).

If now the situation is no longer limited to the first ambiguity, a similar procedure may be carried out by solving the set of equations by rearranging equation (17).

Advantageously, associated with each equation is a quality criterion Q, which lies between a minimum value and a maximum value. A criterion of minimum value corresponds to an unusable measurement, while a maximum value corresponds to a very good measurement.

This quality index Q may depend on various parameters, for example the S/N ratio, two measurements made using notably two AF values of opposite sign.

There are therefore five potentially useable measurements:

an angle measurement corresponding to the standby sequence (100 ms);

four measurements at most (and two measurements at least) corresponding to the four 50 ms FFTs of the confirmation sequence (4×50 ms).

The angle measurement carried out during the standby sequence is given by the following equation:

$$\frac{a\sin\theta}{\lambda} = f\left(\varepsilon\left(\sum, \Delta\right)\right) \text{ Quality index } Q0 \qquad (18)$$

The function "$f$" is a function for linearizing the deviation measurement, i.e. it makes it possible to estimate the angle $\theta$ with no bias on the basis of the deviation measurement $\varepsilon$ of equation (16), which is a monotonic, but non-linear, function of the angle $\theta$.

The four measurements corresponding to the four 50 ms FFTs 101, 102, 103, 104 of the confirmation sequence are given by the following four equations:

$$4\pi\left(\frac{a\sin\theta}{\lambda} - \frac{\Delta F_a}{c}R_0\right) = \Delta\phi F_a + k_a 2\pi \quad \text{Quality index } Qa \qquad (19)$$

$$4\pi\left(\frac{a\sin\theta}{\lambda} - \frac{\Delta F_b}{c}R_0\right) = \Delta\phi F_b + k_b 2\pi \quad \text{Quality index } Qb$$

$$4\pi\left(\frac{a\sin\theta}{\lambda} - \frac{\Delta F_c}{c}R_0\right) = \Delta\phi F_c + k_c 2\pi \quad \text{Quality index } Qc$$

$$4\pi\left(\frac{a\sin\theta}{\lambda} - \frac{\Delta F_d}{c}R_0\right) = \Delta\phi F_d + k_d 2\pi \quad \text{Quality index } Qd$$

Advantageously, the quality indices Qa to Qd are tested with respect to a threshold and only the equations corresponding to an index above the threshold are retained.

If no equation is retained, the situation is in the previous case 1; if a single equation is retained, the situation is in case 2; and if two to four equations are retained, the situation is in the feasible unambiguous resolution case, i.e. case 3. It will be assumed that the situation is in case 3 for the rest of the explanation.

In this situation, there is a set of equations with the following unknowns: the angle, the distance and the modulo integers.

Advantageously, the procedure starts by determining the set of integers $(k_a, \ldots, k_d)$ corresponding to the phase modulo values. To do this, the measurement pair in which the quality indices Q are maxima is isolated. After detection in standby phase, the angle $\theta$ has been measured. A maximum quality index is associated with each of the two equations, and it is possible therefore to deduce therefrom, with no ambiguity due to the angle $\theta$, for each equation, three ambiguous-distance positions, i.e. a triplet. Previously, it was assumed that only three ranks of ambiguity were dealt with.

Advantageously, if x and y are the numbers of the previous two equations, there are two triplets of ambiguous distance estimates, namely (Rx1, Rx2, Rx3); and (Ry1, Ry2, Ry3). With these two triplets, it is possible to form nine distance pairs by combining an "x" measurement with a "y" measurement. The pair having the minimum distance difference is determined.

Advantageously, this minimum distance difference is tested with respect to a rejection threshold, which depends on the quality indices. If this difference is below the rejection threshold, the distance measurement is declared to be valid and the modulo integers k of the valid equations are deduced therefrom.

Moreover, it will be obvious to those skilled in the art that the optimum set of $\Delta F$ values should be determined by optimization techniques. Ideally, the set of $\Delta F$ values must allow ambiguity resolution, with no rank error, irrespective of the distance of the target in the distance domain dealt with, with the minimum S/N ratio, i.e. with the maximum amount of noise on each phase measurement. The measurement precision may also be taken into account when the S/N ratio is higher. Depending precisely on what it is intended to favour, a cost function is to be defined and the set of $\Delta F$ values that minimizes this cost function is determined using known mathematical methods.

$$X = \frac{a\sin\theta}{\lambda}, \quad \alpha_{a,b,c,d} = -\frac{4\pi\Delta F_{a,b,c,d}}{c}$$

By setting:
and $Z_{a,b,c,d} = \Delta\phi F_{a,b,c,d} + k_{a,b,c,d}2\pi$, it is possible to rewrite the set of equations (18) and (19) in the following simplified general form:

$X + 0R = Z0$ Quality index $Q0$ $X + \alpha_a R = Z_a$ Quality index $Qa$ $X + \alpha_b R = Z_b$ Quality index $Qb$ $X + \alpha_c R = Z_c$ Quality index $Qc$ $X + \alpha_d R = Z_d$ Quality index $Qd$ In matrix form, the equation MX=Z and the quality index Q are given by:

$$M = \begin{pmatrix} 1 & 0 \\ 1 & \alpha_a \\ 1 & \alpha_b \\ 1 & \alpha_c \\ 1 & \alpha_d \end{pmatrix} \quad X = \begin{pmatrix} X \\ R \end{pmatrix} \quad Z = \begin{pmatrix} Z0 \\ Z_a \\ Z_b \\ Z_c \\ Z_d \end{pmatrix} \text{ and } Q = \begin{pmatrix} Q0 \\ Q_a \\ Q_b \\ Q_c \\ Q_d \end{pmatrix}$$

Advantageously, this linear system may be solved:
algebraically in a "conventional manner" if there are only two valid equations;
using the least squares approach if there are strictly more than two valid equations. In this case, the "weight" given to each Z measurement is deduced from the quality index Q. If all the weights are equal, the best estimate minimizes the norm $\|MX-Z\|^2$ and is given by the equation: $\hat{X}_{MC} = (M^TM)^{-1}M^TZ$. This matrix equation can easily be expanded since the matrix to be inverted $(M^TM)$ is a 2×2 matrix.

Other methods of resolving the distance ambiguity are possible. One ambiguity resolution system is described notably in French Patent Application FR 09/000,243.

As regards the precision on the ambiguity resolution, if only two (x, y) measurements in the distance ambiguity resolution phase are valid (the worst case) and if the phase measurements are independent and have the same standard deviation $\sigma_\phi$, then the angle and distance standard deviations are given by:

$$\sigma(\sin\theta) = \frac{\sqrt{\Delta F_x^2 + \Delta F_y^2}}{|\Delta F_x - \Delta F_y|} \frac{\lambda\sqrt{2}}{a} \sigma_\phi$$

$$\sigma(R) = \frac{c\sqrt{2}}{4\pi|\Delta F_x - \Delta F_y|} \sigma_\phi$$

Here too, it will be seen that there is a benefit in using pairs of measurements in which the $\Delta F$ values are of opposite signs, thereby maximizing the denominator in the above formulae.

If the measurements are made with an S/N ratio, the phase measurement has an approximate error of $$\sigma_\phi \cong \frac{1}{\sqrt{2S/N}}$$

Thus, for an S/N=10 dB, the phase standard deviation is 0.22 rd, i.e. about 0.036×2π. With the numerical values of the examples in the previous paragraph, for case 1 in which $\Delta Fx,y=\pm 50$ kHz, the estimated noise values at 1σ are:
110 milliradians on the angle, i.e. a "raw" altitude noise of 110 m to 10 km; and
75 m on the distance.

In search phase, in which only the angle and the RRV are measurable, the error on the angle is:

$$\sigma(\sin\theta) = \frac{\lambda\sqrt{2}}{8\pi a} \sigma_\phi$$

During the established tracking phase, the waveform may be slightly modified compared with the waveform shown in FIG. 10. Established tracking corresponds to the case in which the current tracks are sustained, excluding initialization of the tracks and excluding standby alone. The standby sequence 100 is therefore followed in this case by a tracking sustain sequence.

The modification consists, in the tracking sustain sequence, in locking the carrier wave frequency onto a frequency different from that of the carrier wave of the preceding standby sequence, instead of locking it onto the carrier wave frequency of the preceding standby sequence.

For the sake of simplification, it is possible however to use the same waveform scheme as in the detection confirmation phase shown in FIG. 10. The advantage of such a slightly modified wavefrom as described above is notably that the standby and tracking phases take place at two different frequencies:

if the outcome of the fluctuating RCS of the target at the "standby" carrier wave frequency is too low, a more favourable outcome may be expected at the "tracking" frequency: therefore, the track may be refined in terms of RRV, distance and angle;

if this is not the case, it might be expected to refine the tracking only in terms of the RRV and angle, this not being too serious since it has been assumed that threatening targets are on a collision path, and therefore have a constant RRV, and the current estimate of the distance is therefore obtained by integrating the RRV.

Advantageously, and benefiting from the fact that only targets on collision paths are of interest, since the most critical condition relates to horizontal traffic separation, it is apparent that the area of correlation of the measurements of one observation sequence with the next sequence depends on the distance of the target and has to be determined:

at around 10 km:
  only on three Doppler blocks centred around the block in which the initial detection took place, in order to take the quantization effects of the Doppler filters into account and
  only in an antenna lobe formed after the DBF;
at around 6 km:
  only on five Doppler blocks around the block in which the initial detection took place, in order to take the quantization effects of the Doppler filters into account and
  only in one or two antenna lobes formed after the DBF; and
at around 2 km:
  only on around fifteen Doppler blocks, around the block in which the initial detection took place and
  only on two antenna lobes formed after the DBF.

Advantageously, the angle and RRV correlation windows, in particular the RRV correlation window, are not centred around the intended point since the collision avoidance criterion enables the direction of change to be predicted and, in particular if the situation is not an exact collision case, the RRV can only decrease.

As regards refining the distance, RRV and angle estimates in the event of a new measurement, after a tracking observation sequence (lasting in total 300 ms), the situation may be in one of the following cases:

Case 1: no target detection in the correlation domain;
Case 2: target detection in the correlation domain;
  in the observation sequence phase dedicated to standby, angle and RRV measurements are unambiguous;
Case 3: a single target detection in the correlation domain:
  in the observation sequence phase dedicated to distance measurement, there is only ambiguous measurement among the angle and distance measurements;
Case 4: two target detections in the correlation domain:
  one target detection in the observation sequence phase dedicated to standby and
  another target detection in the observation sequence dedicated to distance measurement:
  there are unambiguous measurements of the angle and the RRV, and an ambiguous distance measurement (within about 3000 m);
Case 5: two target detections in the correlation domain:
  in the observation sequence phase dedicated to distance measurement, if the distance ambiguity rank assumption is made, the ambiguity between the angle and the distance may be resolved; and
Case 6: at least three target detections in the correlation domain:
  irrespective of their positions in the observation sequence, there are unambiguous measurements of the angle, the RRV and the distance.

One tracking refinement strategy may be the following:

in case 1 and case 3, the estimates are not refined. The quality index of the state vector is lowered to a certain value associated with both of these cases, and the event counter is incremented by 1;

in case 2, only the RRV and angle estimates are refined by the new measurements. The quality index of the state vector is lowered by a certain value associated with this case, and the event counter remains unchanged; and in all other cases, the RRV, angle and distance estimates are refined (specifically the prediction error is markedly smaller than the distance between two distance ambiguities: the ambiguity rank of the new measurement may therefore be determined without any error. The quality index of the state vector is modified by a certain value depending on the case encountered, and the event counter is reset to zero.

As mentioned above, when the event counter exceeds a certain threshold (prolonged absence of tracking refinement), the track is abandoned.

Any known method may be used for the refining, measurement filtering and estimating: Kalman filters, non-adaptive filters with a deterministic gain coefficient, "α-β" filters, for example.

Publication in the navigation system and/or any abandonment of certain tracks are based on tests on:
  the track quality index; and
  the event counter.

Several criteria may be employed, depending on the "system" requirements or depending on the available computing resources.

Having described the first waveform, the second waveform will now be considered. This second waveform is of the LPRF Doppler type, LPRF standing for "low pulse repetition frequency". It covers the endo-clutter zone and is therefore applicable to targets with a relative radial velocity RRV lower than the velocity Vp of the platform, for example Vp=100 m/s. This second waveform is limited in the instrument domain, for example to 2000 metres in distance. This distance corresponds, as in the case of a fast-moving target, to a 20 second prewarning Since the first waveform has a minimum range of 9200 metres in the previous numerical examples, the second waveform does not need to be as sensitive as the first. The distance ratio, i.e. 9200/2000, results in a sensitivity difference of 26.5 dB, which is considerable.

Considering identical antenna gains, with an observation time halved two compared with the first waveform, the average transmit power may be reduced by a factor of around 200 times.

However, this waveform must have the following characteristics:

there must be no velocity ambiguity in respect of the target and the ground clutter, i.e. over a domain greater than ±100 m/s (i.e. a 13.2 kHz bandwidth in X-band operation);

there must be no distance ambiguity in respect of the target, but also in respect of ground clutter, so as to maximize the "target/clutter" ratio;

it must have a short blind distance, of less than 500 m (below this distance, an avoidance manoeuvre is considered to be unfeasible); and it must have very good distance resolution in order to maximize the target/clutter ratio.

The radar principle associated with this second waveform is the same as that used for the first waveform. In particular, the space coloration system on transmit and the DBF on receive are maintained. It is simply necessary to use a pulse chopping device, which is unnecessary in the case of continuous waveforms.

As regards the elementary patterns of this second waveform, it is necessary to consider the following:

the choice of distance resolution;
the choice of Doppler resolution;
the choice of repetition frequency; and
the choice of space coloration codes As regards the distance resolution, it is advantageous to reduce the size of a distance block in order to reduce the ground clutter area and consequently the inconvenience thereof. However, for a maximum RRV of 100 m/s and a Doppler processing time of around 50 ms (as in the case of the 1st waveform), the distance migration during the Doppler processing time is 5 metres. Considering a small target measuring 5 to 10 metres in length, it may be seen that a distance resolution of 10 to 15 metres makes it possible to meet the criterion of there being no distance migration. Consequently, the distance resolution is set for example at 15 metres, corresponding to a 10 MHz transmitted bandwidth and a time resolution of 100 ns.

As regards the choice of Doppler resolution, the same elementary pattern as for the first waveform is used for example, that is to say with coherent durations of about 50 milliseconds grouped in pairs having a duration of 100 milliseconds.

As regards the choice of pulse repetition frequency PRF, the condition on there being no Doppler ambiguity of the waveform means that the PRF is >13.2 kHz or the PRP is <75 µs, PRP being the pulse repetition period. The condition that there be an absence of distance ambiguity with respect to the target is reflected in PRP>13.3 µs. Therefore, the possible PRP range is [13.3-75 µs].

As regards the choice of space coloration codes, the orthogonality condition may be achieved for example by using:

carrier waves with separate frequencies F1 and F2; and
codes that are insensitive to Doppler-distance coupling.

Using separate carrier wave frequencies F1 and F2, orthogonality means in this case transposing the principle used for the first "high-speed target" waveform. If orthogonality using pulses of duration τ is required (assuming that there is no pulse compression and that the pulse is perfectly rectangular), the frequency difference between F1 and F2 carrier waves must satisfy the equation: $\Delta F=k/\tau$, where k is a non-zero integer.

If the equations established for the 1st waveform are transposed, notably equation (12') and equation (14'), in the present case, the phase of the received signal is found to have much more pronounced angle-distance coupling than in the case of the first waveform. This effect is appreciable over a distance shorter than the distance resolution.

If the targets were discrete points on the scale of the distance resolution, i.e. 15 m, the problem would be resolved as in the case of the first waveform.

In fact, this assumption is not generally valid on actual targets, in which a plurality of bright spots of similar size are found (this is moreover the fluctuation mode assumption known by those skilled in the art by the name "Swerling 1"): the operator is therefore confronted with a plurality of coupling modes that cause unacceptable scintillation effects.

If it is desired to be able to transpose the principle used for the 1st waveform, it is therefore necessary for it to be replaced in a configuration in which $\Delta F \ll 1/\tau$. In this case, orthogonality is no longer sought at pulse level, but at Doppler pulse train level.

This solution adopts the principle used for the first waveform, notably the case described in FIG. 6b. In the present case, as only endo-clutter targets are of interest, separation on receive between target signals and clutter signals, corresponding to each of the transmitted orthogonal codes, is definite if the difference $\Delta F=|F1-F2|$ is greater than or equal to 13.2 kHz (maximum ground clutter Doppler bandwidth for a platform at 100 m/s, i.e. a clutter spread over a band equivalent to 2Vp=200 m/s).

On receive, there will therefore be a signal whose "apparent" Doppler bandwidth is $$2\frac{2Vp}{\lambda} + |\Delta F|.$$

The pulse repetition frequency therefore now must be designed so that there is no ambiguity in this frequency domain. The pulse repetition frequency range is therefore kept small at PRF∈[26.4-75 kHz]. The possible pulse repetition period PRP range is [13.3-37.5 µs].

Figure 11A:
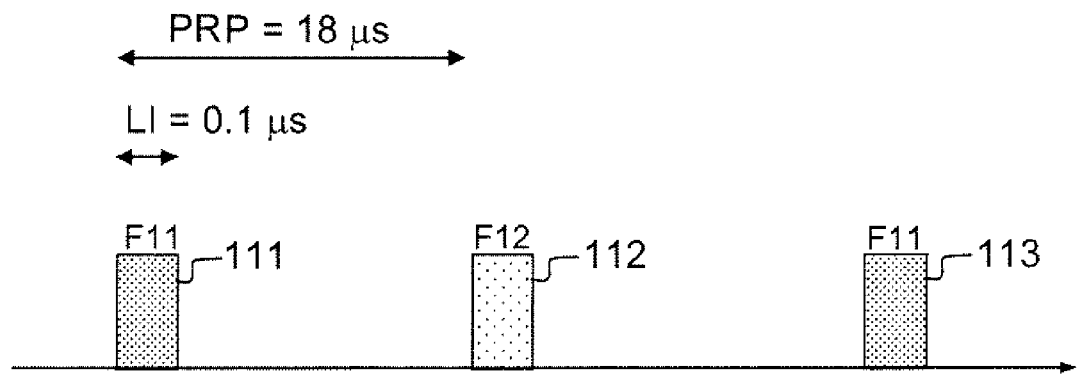
FIGS. 11a and 11b, an example of an elementary pattern for a second waveform used notably for a short-range application.
Figure 11B:
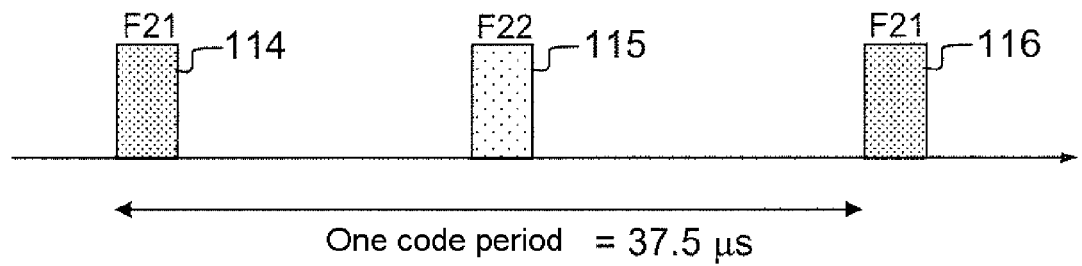

One example of a very simple waveform that meets all these criteria is illustrated by FIGS. 11a and 11b, FIG. 11a showing the waveform for the first transmit subarray 23 and FIG. 11b showing the waveform for the second transmit subarray 24. For example, the pulse repetition period is 18 µs and the pulse width is 0.1 µs.

In the waveform of FIG. 11a, the frequency of the first pulse represented by 111 is the frequency F11 and the second pulse 112 is at the frequency F12, and then a new cycle starts again with a pulse 113 at frequency F11 and a pulse at frequency F12 (not shown).

In the waveform of FIG. 11b, the frequency of the first pulse represented by 114 is at the frequency F21, the second pulse 115 is at the frequency F22 and then a new cycle, or elementary pattern, starts again with a pulse 116 at F21 and a pulse at F22 (not shown). The pulses of the two waveforms are synchronous, thus the pulse 111 transmitted at F11 by the first subarray 23 is synchronous with the pulse 114 transmitted at F21 by the second subarray 24.

For example, the frequencies are chosen in the following manner:

$$F_{11}=F_X+\Delta F/2 \quad F_{12}=F_Y+\Delta F/2$$

$$F_{21}=F_X-\Delta F/2 \quad F_{22}=F_Y-\Delta F/2.$$

The insertion of the pulses at frequencies F12 and F22 around FX and FY is intended for obtaining a post-integration gain. In fact, very simple short pulses are used, but there is an advantage in a possible PRP range of [13.3–37.5 µs], which is rather enormous, so as to gain in sensitivity by inserting a second train of pulses.

Possibly there are nth trace echoes (with high RCS values). To avoid this drawback, it is advantageous for the PRP to be varied slightly from one block of FFT pairs to several blocks of FFT pairs (that is to say every 100 ms). Strictly speaking there is no ambiguity resolution, but an ambiguous echo will undergo no apparent movement coherent with that of a target on a collision path. Thus, no tracking can be established.

Advantageously, the central frequencies Fx and Fy will be chosen so that all the separate frequencies among the set of four frequencies above correspond to orthogonal pulses. If Fy>Fx and ΔF>0, this amounts to obtaining orthogonality on the signals at $F_X+\Delta F/2$ and $F_Y-\Delta F/2$, for the purpose of limiting the distance aliasing effects of the ambiguous echoes.

It should be noted that the above frequencies correspond neither necessarily to a regular spacing nor necessarily to an increasing or decreasing progression.

This solution has the following advantages:
the pulses are as simple as possible;
the target distance domain is >2000 m;
the ground clutter Doppler domain is correct; and
maximum power is transmitted with minimum complexity.

Another solution also adopts the principle used in the case of the first waveform, but only in the case of FIG. 6a. This solution is very similar to the previous solution, but the frequency difference is very small. With a pulse train of about 50 ms duration (20 Hz resolution), it is possible for example to take ΔF=80 Hz. In this case, each cycle comprises for example four frequencies instead of two, as in the case of the solution above illustrated by FIGS. 11a and 11b. Thus, a cycle transmitted by the first transmit subarray 23 comprises for example four successive pulses at $F_{11}$, $F_{12}$, $F_{13}$ and $F_{14}$ respectively. Likewise, a cycle transmitted by the second subarray 24 comprises for example four successive pulses at $F_{21}$, $F_{22}$, $F_{23}$ and $F_{24}$ respectively.

The frequencies are, for example, chosen in the following manner:

$$F_{11}=F_X+\Delta F/2 \quad F_{12}=F_Y\Delta F/2$$

$$F_{21}=F_X-\Delta F/2 \quad F_{22}=F_Y-\Delta F/2$$

$$F_{13}=F_X-\Delta F/2 \quad F_{14}=F_Y-\Delta F/2$$

$$F_{23}=F_X+\Delta F/2 \quad F_{24}=F_Y\Delta F/2.$$

Another possible solution consists in transmitting the signal sequentially on the two subarrays 23, 24 of the transmit array 11, 111, 112, 113. The difference between transmission of the pulse transmitted at the frequency F1 on the first subarray 23 and the transmission of the pulse at the frequency F2 on the second subarray 24 must be sufficient to provide the desired distance coverage, for example 2000 metres. This solution causes coupling, this time coupling between the Doppler and the angle (distance). The pulse repetition period of the code must be such that the Doppler band of the echoes that are to be processed must not be ambiguous.

As regards the orthogonality by using codes that are insensitive to distance-Doppler coupling, this orthogonality is sought in the pulses, unlike the previous solutions.

The waveforms satisfying this criterion consist of the same carrier wave, but modulated by two orthogonal codes C1(t) and C2(t) (for two waveforms):

$$SE_1(t)=C_1(t)\exp(2\pi jFt)$$

$$SE_2(t)=C_2(t)\exp(2\pi Ft).$$

In order for these codes to satisfy the desired property, if $YC_1(t)$ and $YC_2(t)$ are the autocorrelation functions of these codes (assumed to be maximum functions and equal to 1 in the case of t=0), the following have to be satisfied: orthogonality condition:

$$Y(t) = \left| \int_{-\infty}^{\infty} C_1(\tau)C_2(\tau-t)d\tau \right| << 1 \; \forall t$$

amplitude autocorrelation:

$$YC_{1,2}(t) = \left| \int_{-\infty}^{\infty} C_{1,2}(\tau)C_{1,2}(\tau-t)d\tau \right| \begin{cases} \approx 1 & \forall t \in [-\delta t/2; +\delta t/2] \\ << 1 & \forall t \notin [-\delta t/2; +\delta t/2] \end{cases}$$

and
differential phase between autocorrelation functions:

$$\arg(YC_1(t);YC_2(t))=\text{constant} \forall t \in [-\delta t/2; +\delta t/2].$$

The first condition ensures that there is channel separation, the second condition enables a satisfactory distance pulse response to be obtained and the third condition enables the distance-angle coupling to be overcome.

Among the codes that can meet these criteria, the following codes may notably be mentioned: PN (pseudo-noise) codes, for example Gold, Barker and Kasami codes.

In another possible type of solution, the two orthogonal codes are formed by a Barker code and the same Barker code but time-reversed. A subsidiary benefit associated with using such codes is that they may also serve as pulse compression codes.

All the numerical values in the description are given by way of example in order to shed light on the description of the various solutions.

What is claimed is:

1. An airborne radar device including a given angular coverage in elevation and in azimuth, comprising a transmit system, a receive system and processing means carrying out target detection and location measurements, wherein the transmit system comprises:
a transmit antenna made up of at least a first linear array of radiating elements focusing a transmit beam, said arrays being approximately parallel to one another;
at least one waveform generator;
means for amplifying the transmit signals produced by the waveform generator or generators; and
means for controlling the transmit signals produced by the waveform generator or generators, said control means feeding each radiating element with a transmit signal,
the radiating elements being controlled for simultaneously carrying out electronic scanning of the transmit beam in elevation and for coloured transmission in elevation.

2. The radar device according to claim 1, wherein, when the transmit antenna comprises P linear arrays, the control means:
controls the transmit signals so that each linear array produces a transmit beam along an eigendirection, the set of transmit beams produced being angularly offset in elevation; and
comprise switches for switching the transmit signals to each of the P linear arrays in succession, the electronic scanning at transmission being obtained by switching the signal supply for the P arrays, the transmit beams of which are directed in P separate directions.

3. The radar device according to claim 1, wherein the receive system comprises at least:
- a linear array of radiating elements directed along a direction orthogonal to the linear arrays of the receive system; and
- processing means producing a receive beam by digital beam-forming in azimuth.

4. The radar device according to claim 1, wherein the transmit system further comprises at least two waveform generators, a first waveform generator delivering a signal at a first frequency F1 and a second waveform generator delivering a signal at a second frequency F2, each transmit array being split into two subarrays, the radiating elements of the first subarray being fed with the signal at the first frequency F1 and the radiating elements of the second subarray being fed with the signal at the second frequency F2, coloured transmission being obtained by transmitting over the first subarray at the first frequency F1 and by transmitting over the second subarray at the second frequency F2.

5. The radar device according to claim 4, wherein the processing means of the receive system calculates, in the elevation plane, a sum channel and a difference channel according to the single-pulse technique on the basis of the signals received, on the one hand, at the first frequency F1 and, on the other hand, at the second frequency F2.

6. The radar device according to claim 1, wherein it detects and locates a target in at least two steps, comprising:
- in a first step, the radar detects a possible target with a maximum detection sensitivity and measures at least the closing velocity of the target moving towards the radar; and
- in a second step, when a target is detected, the radar measures the direction and the distance of the target.

7. The radar device according to claim 1, wherein the detection of a target uses very high-resolution spectral analysis followed by long non-coherent integration, these two characteristics being adapted to targets in a collision path.

8. The radar device according to claim 1, wherein it uses two waveforms, a wave generator delivering two waveforms, a first waveform being adapted to high-speed targets located in Doppler frequency mode or in distance measurement mode in the presence of thermal noise, the second, reduced-range waveform being adapted to slow-moving targets that can be detected against a ground clutter background.

9. The radar device according to claim 8, wherein the first waveform is a continuous sinusoidal wave.

10. The radar device according to claim 8, wherein the first waveform uses, as colour transmit waveform, at least two continuous waves frequency-shifted by k/T, where T is the Doppler integration time and k is a non-zero relative integer.

11. The radar device according to claim 8, wherein the first waveform uses, on receive, as weighting window, Fourier transforms of polynomials of sine or cosine functions of any order.

12. The radar device according to claim 8, wherein the ambiguity in angle and distance measurements resulting from the use of the first colour transmit waveform is resolved by transmitting sinusoidal waves spaced apart by a plurality of frequency differences.

13. The radar device according to claim 8, wherein, for the first waveform, it uses frequency differences between transmit arrays of opposite signs.

14. The radar device according to claim 13, wherein the frequency differences have substantially the same absolute value.

15. The radar device according to claim 12, wherein the resolution of the ambiguity in the angle and distance measurements, in respect of the first waveform, firstly takes place by resolving the distance ambiguity rank by using the plurality of frequency differences.

16. The radar device according to claim 15, wherein the resolution of the ambiguity in the angle and distance measurements, in respect of the first waveform, is performed in the least-squares sense when the distance ambiguity rank is resolved.

17. The radar device according to claim 8, wherein the second waveform is a pulsed sinusoidal wave.

18. The radar device according to claim 17, wherein the coloured transmission of the second waveform uses the transmission of at least two pulsed sinusoidal carrier waves of frequencies F1, F2, which are frequency-shifted by k/T where T is the Doppler integration time and k is a non-zero relative integer.

19. The radar device according to claim 17, wherein the coloured transmission of the second waveform uses the transmission of at least two pulsed sinusoidal carrier waves frequency-shifted by PRF/q, where PRF is the pulse repetition frequency and q is a non-zero positive integer.

20. The radar device according to claim 19, wherein the parameter q is equal to 2.

21. The radar device according to claim 17, wherein the coloured transmission of the second waveform uses the transmission of at least two pulsed sinusoidal carrier waves frequency-shifted by substantially twice the Doppler frequency spread of the ground clutter.

22. The radar device according to claim 17, wherein the coloured transmission of the second waveform uses the transmission of at least two pulsed sinusoidal carrier waves frequency-shifted by substantially twice the maximum Doppler frequency of the ground clutter along the axis of the aircraft carrying said radar device.

23. The radar device according to claim 17, wherein, since the receive signals are transposed in the frequency domain by an FFT (Fast Fourier Transform), the coloured transmission of the second waveform uses the transmission of at least two pulsed sinusoidal carrier waves frequency-shifted by a frequency difference $\Delta F$, the sign of this frequency difference being switched from one FFT sequence to the next.

24. The radar device according to claim 17, wherein, since the receive signals are transposed in the frequency domain by an FFT (Fast Fourier Transform), the coloured transmission of the second waveform uses the transmission of at least two pulsed sinusoidal carrier waves frequency-shifted by a frequency difference $\Delta F$, the absolute value of this frequency difference being switched from N FFT sequences to N FFT sequences.

25. The radar device according to claim 24, wherein the number N is equal to 2.

26. The radar device according to claim 17, wherein the coloured transmission of the second waveform uses the transmission of at least two pulsed sinusoidal waves modulated by orthogonal phase codes.

27. The radar device according to claim 26, wherein the coloured transmission of the second waveform uses the transmission of at least two pulsed sinusoidal waves modulated by orthogonal phase codes obtained by time reversal from one relative to the other.

28. The radar device according to claim 17, wherein the coloured transmission of the second waveform uses the transmission of at least two pulsed sinusoidal waves modulated by identical but time-reversed Barker codes.

29. The radar device according to claim 17, wherein the second waveform uses, on receive, as weighting window, Fourier transforms of the any-order polynomials having sine or cosine functions as variables.

* * * * *